(12) United States Patent
Murzanski et al.

(10) Patent No.: US 12,292,144 B2
(45) Date of Patent: May 6, 2025

(54) ROTARY UNION

(71) Applicant: Murzanski Engineering, Kalispell, MT (US)

(72) Inventors: Matthew Murzanski, Inverness, IL (US); Boguslaw Stypula, Chicago, IL (US)

(73) Assignee: Murzanski Engineering, Kalispell, MT (US)

( * ) Notice: Subject to any disclaimer, the term of this patent is extended or adjusted under 35 U.S.C. 154(b) by 0 days.

(21) Appl. No.: 18/755,048

(22) Filed: Jun. 26, 2024

(65) Prior Publication Data

US 2024/0344644 A1 Oct. 17, 2024

Related U.S. Application Data

(63) Continuation of application No. 18/444,193, filed on Feb. 16, 2024, which is a continuation of application No. PCT/US2023/075034, filed on Sep. 25, 2023.
(Continued)

(51) Int. Cl.
*F16L 39/04* (2006.01)
*B29C 45/17* (2006.01)

(52) U.S. Cl.
CPC .......... *F16L 39/04* (2013.01); *B29C 45/1775* (2013.01)

(58) Field of Classification Search
CPC ......... F16L 39/04; F16L 39/06; F16L 27/087; F16L 27/0828
See application file for complete search history.

(56) References Cited

U.S. PATENT DOCUMENTS 3,002,769 A 10/1961 Deubler et al.
4,194,767 A 3/1980 McCracken
(Continued)

FOREIGN PATENT DOCUMENTS

DE 3810060 A1 10/1989
EP 2799752 A1 * 11/2014 ............ F16L 39/06
(Continued)

OTHER PUBLICATIONS

How Multi-Passage Rotary Unions Work, The Kadant Blog, https://www.kadant.com/en/blog/rotary-joints-unions/how-multi-passage-rotary-unions-work, visited Jun. 27, 2023.
(Continued)

*Primary Examiner* — Matthew Troutman
*Assistant Examiner* — Fannie Kee
(74) *Attorney, Agent, or Firm* — Banner & Witcoff, Ltd.

(57) ABSTRACT

An improved water union may include a fixed portion and a rotating portion. The fixed portion of the water union may be physically coupled to a stationary portion of a machine or other stationary object and the rotating portion may be physically coupled to a rotating portion of a machine or other rotating object. For example, a rotating table may include a stationary base to which the fixed portion of the water union may be physically attached, while the rotating portion of the water union may be physically attached to a rotating surface. In doing so, the rotating portion of the water union may be capable of freely rotating with the rotating surface, while maintaining a constant physical orientation to objects on the rotating surface within a rotating frame of reference.

19 Claims, 20 Drawing Sheets

Related U.S. Application Data

(60) Provisional application No. 63/458,568, filed on Apr. 11, 2023.

(56) References Cited

U.S. PATENT DOCUMENTS

| | | | |
|---|---|---|---|
| 4,296,952 A | 10/1981 | McCracken | |
| 4,976,282 A | 12/1990 | Kubala | |
| 5,462,083 A | 10/1995 | Kaspar | |
| 5,713,609 A | 2/1998 | Mascola | |
| 6,929,099 B2 | 8/2005 | Jakob et al. | |
| 7,976,069 B2 | 7/2011 | Imai et al. | |
| 8,113,545 B2 | 2/2012 | Takahashi | |
| 10,088,089 B2 | 10/2018 | Kikuyama et al. | |
| 11,274,782 B2 | 3/2022 | Petrou et al. | |
| 2001/0052676 A1* | 12/2001 | Omiya | F16L 27/087 277/614 |
| 2008/0061514 A1* | 3/2008 | Suzuki | F16L 39/04 277/375 |
| 2008/0302994 A1 | 12/2008 | Syzkulski | |
| 2009/0293970 A1* | 12/2009 | Fuller | F16L 27/087 137/625 |
| 2016/0258564 A1 | 9/2016 | Fukumoto et al. | |
| 2017/0051857 A1* | 2/2017 | Sakakura | F16L 39/04 |
| 2018/0058593 A1* | 3/2018 | Suzuki | F16L 39/06 |
| 2021/0317937 A1* | 10/2021 | Kikuyama | F16L 39/06 |
| 2022/0120366 A1* | 4/2022 | Suzuki | F16L 39/04 |
| 2022/0205541 A1* | 6/2022 | Ishijima | F16L 39/06 |

FOREIGN PATENT DOCUMENTS

| | | | | |
|---|---|---|---|---|
| GB | 1141986 A | | 2/1969 | |
| JP | 2001141150 A | * | 5/2001 | ............ F16L 27/087 |
| JP | 2002174379 A | * | 6/2002 | ............ F16L 39/04 |
| JP | 2004019912 A | * | 1/2004 | ............ F16L 27/087 |
| JP | 2004084691 A | | 3/2004 | |
| JP | 2004316775 A | * | 11/2004 | ............ F16L 27/087 |
| WO | 2004090964 A1 | | 10/2004 | |
| WO | 2022233649 A1 | | 11/2022 | |

OTHER PUBLICATIONS

Rotating Unions, Deublin Engineered for Performance, www.deublin.com, visited Jun. 27, 2023.
What is a Rotary Union?, DSTI, https://www.dsti.com/learn/what-is-a-rotary-union/, visited Jun. 27, 2023.
Feb. 14, 2024—(WO) International Search Report and Written Opinion—App PCT/US2023/075034.

* cited by examiner

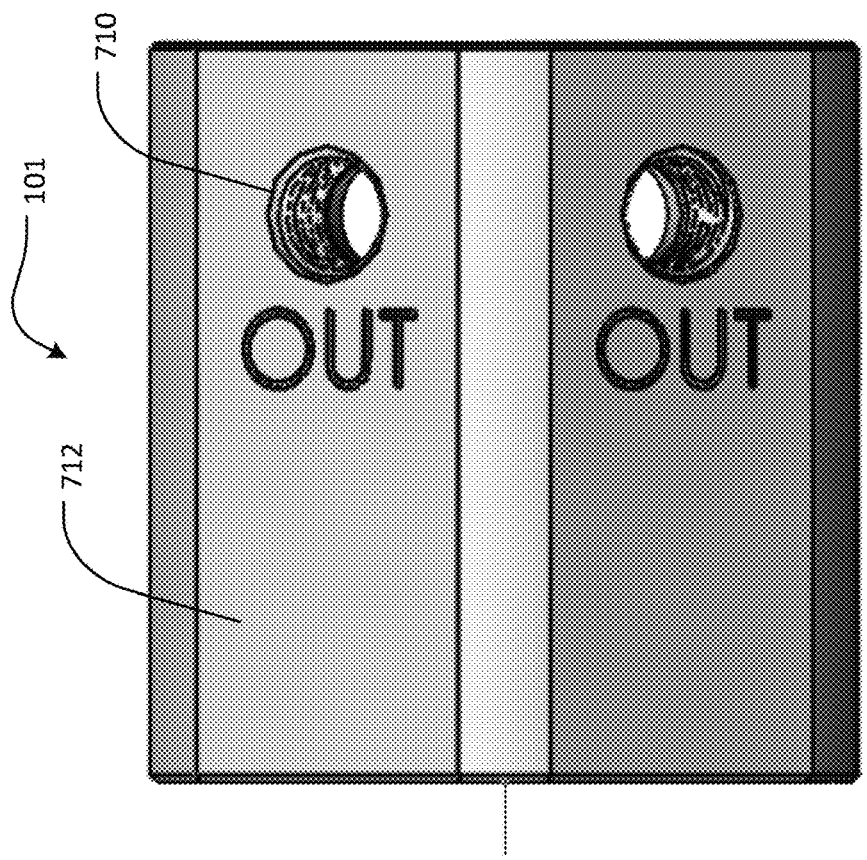
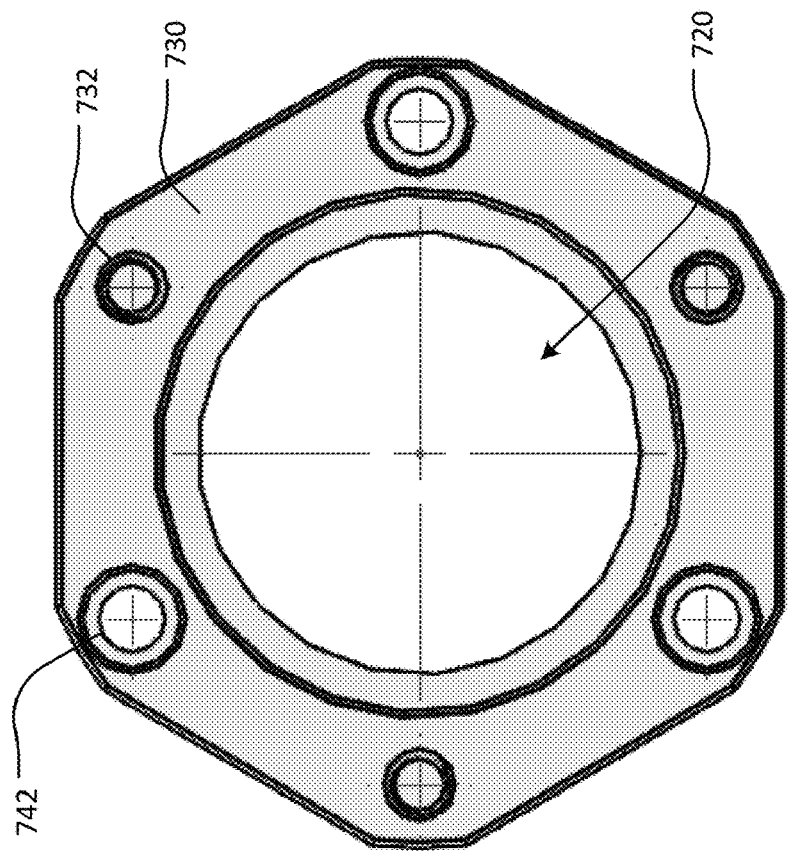
FIG. 7A
Figure 7B

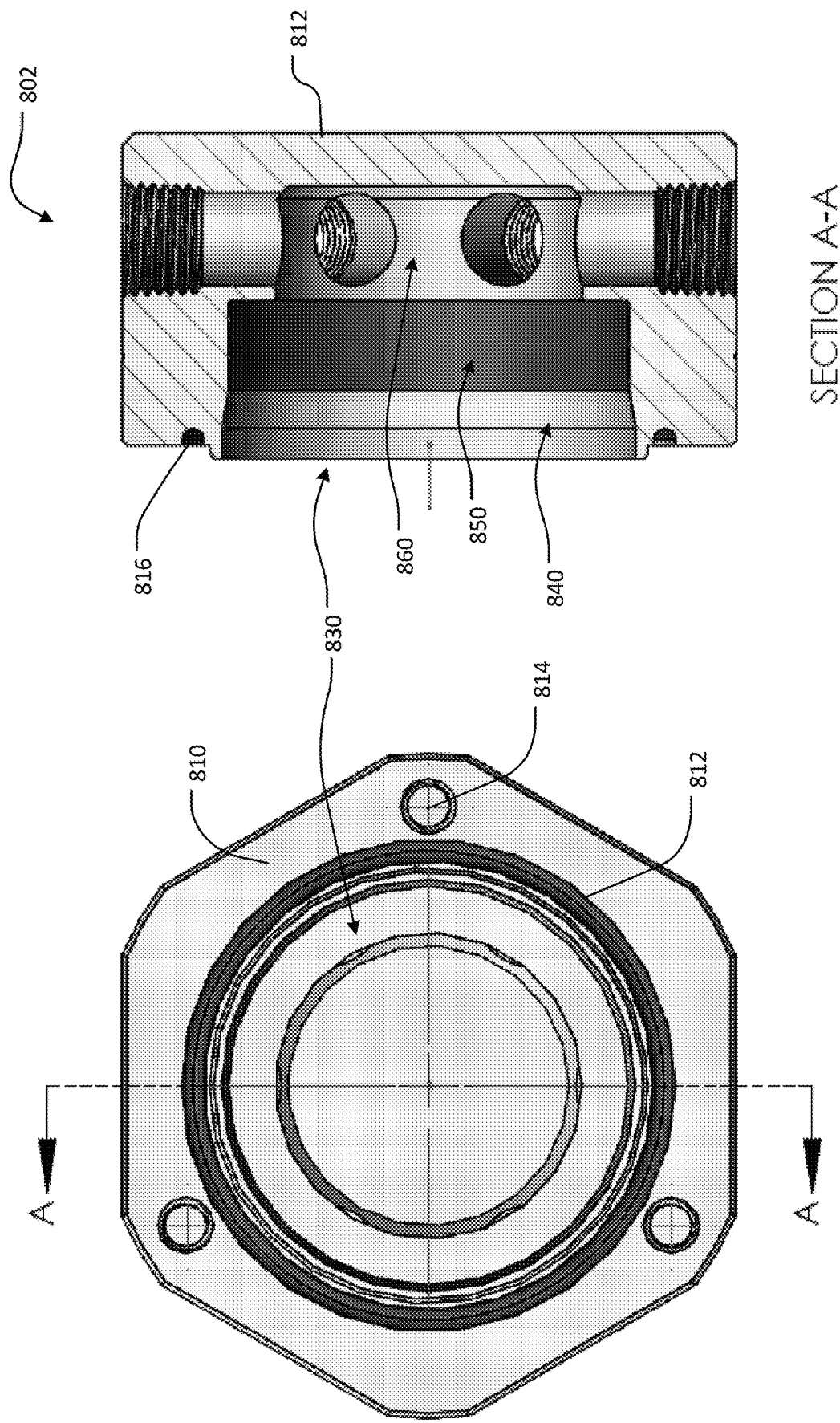

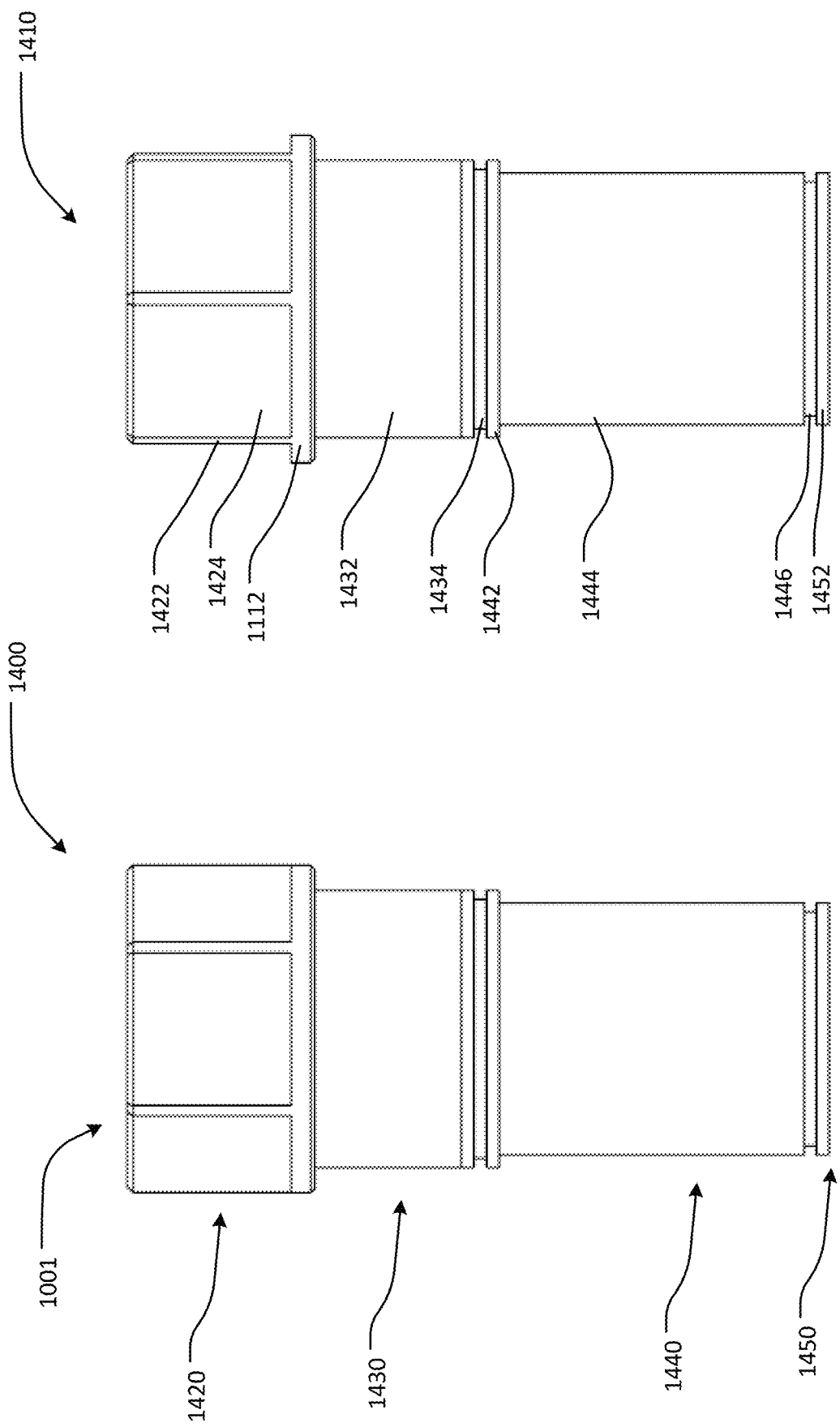

SECTION B-B

ROTARY UNION

RELATED APPLICATIONS

This application is a continuation U.S. application Ser. No. 18/444,193 entitled Rotary Union filed Feb. 16, 2024 which is a continuation of International Patent Application No. PCT/US2023/075034 entitled "Rotary Union" filed Sep. 25, 2023, which claims priority to Provisional Patent Application No. 63/458,568 entitled "Water Union" filed Apr. 11, 2023. Disclosures of the above-referenced applications are incorporated by reference in their entirety.

BACKGROUND

Water and other fluids may be used during an injection molding process to provide cooling for one or more components of an injection molding machine. For example, water may be used due to its low cost, ready availability and favorable thermal characteristics. In some cases, other fluids may be used, such as oil, air or other gases, and the like. The fluid cooling system is used to ensure components of injection molding machines remain at a safe operating temperature. For example, some injection molding machines are cooled to maintain a maximum fluid temperature (e.g., oil, water, etc.) and/or to reduce a temperature at certain points on the injection molding machine (e.g., a temperature at a feed throat). Proper temperature control at a feed throat prevents plastics from melting earlier than desired, while the polymer material is fed into a heated barrel to be transformed from a solid (e.g., a pellet) to melted polymer. Additionally, extreme conditions may result in higher temperatures that allow for safe water use. In such cases, another fluid (e.g., oil) with a higher boiling point may be used.

In some cases, fluids may be used for other purposes during the injection molding process. For example, hydraulics and/or pneumatics may be used to provide a clamping force on a mold (e.g., for an extended time and/or at a greater force), to transfer parts, for actuating core pulls, and/or operating ejectors and valve gates. Often, these uses are performed at a position on a machine undergoing motion, such as on a rotary table. Such rotary tables may be configured to rotate about an axis for a number of degrees. In some cases these rotary tables may be designed to rotate continuously (in one or both directions) and over a full 360 degrees. In these application a water union (e.g., a rotary union, a swivel joint, etc.) may be used allow fluid flow (e.g., fluid transfer under pressure or vacuum) from a stationary inlet to a rotating outlet, thus preserving and isolating the fluid connection. However, current designs are prone to failures and thus require costly maintenance and replacement. Such processes cause extended downtime, either planned or unplanned, thus reducing the injection molding machine's efficiency. As such a need has been recognized for an improved water union having a longer lifetime and greater reliability.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

An improved water union (e.g., a rotary union) may include a fixed portion and a rotating portion. The fixed portion of the water union may be physically coupled to a stationary portion of a machine or other stationary object and the rotating portion may be physically coupled to a rotating portion of a machine or other rotating object. For example, a rotating table may include a stationary base to which the fixed portion of the water union may be physically attached, while the rotating portion of the water union may be physically attached to a rotating surface. In doing so, the rotating portion of the water union may be capable of freely rotating with the rotating surface, while maintaining a constant physical orientation to objects on the rotating surface within a rotating frame of reference.

An illustrative rotary union may include a housing comprising an interior cavity and one or more fluid ports. The rotary union may also include a central shaft rotatably connected to the housing via a bearing assembly, where the central shaft comprises at least one port fluidly coupled to a first flow channel. The rotary union may also include a seal assembly comprising at least one spring, a first seal comprising a first sealing structure providing a first fluid seal at an outer surface of the central shaft, a second sealing structure providing a second fluid seal at an interior surface of the housing and a third sealing structure providing a third fluid seal within the interior cavity of the housing and that defines a flow cavity fluidly connecting the one or more fluid ports of the housing to the first flow channel, wherein a force applied by the at least one spring enables the third fluid seal. In some cases, the rotary union may facilitate fluid flow into the housing via the one or more fluid ports of the rotary union. In some cases, the rotary union may facilitate fluid flow out of the housing via the one or more fluid ports of the rotary union. Further, the rotary union may further include the bearing assembly set in a first cavity section of the interior cavity, wherein the first cavity section is adjacent an opening in a bottom face of the housing. In some cases, the central shaft further comprises a second fluid port fluidly coupled to a second flow channel, wherein a first fluid port facilitates fluid flow into the first flow channel and a second fluid port facilitates fluid flow out of the second flow channel. In some cases, the first sealing structure is in a fixed position relative to the housing, and the second sealing structure rotates relative to the first sealing structure. In some cases, the third sealing structure comprises a first sealing face associated with the first sealing structure and a second sealing face associated with the second sealing structure, wherein the third seal sealing structure comprises a physical connection between the first sealing face and the second sealing face. In some cases, the third sealing structure comprises a ceramic component and a graphite component. In some cases, the seal assembly comprises a pump seal.

An illustrative multiple channel rotary union may include a central shaft comprising two or more fluid channels, a housing comprising two or more fluid ports, an opening in a bottom face of the housing, an interior cavity, wherein the central shaft is partially enclosed within the interior cavity via the opening; and a first annular ring formed on an interior surface of the housing, the first annular ring having a first side facing the interior cavity of the housing and a second side facing the opening in the bottom face of the housing. The multiple channel rotary union may include a bearing rotatably coupling the central shaft to the housing, wherein a first side of the bearing is adjacent to the opening in the bottom face of the housing and a second side of the bearing is adjacent to the second side of the first annular ring and a seal assembly forming one or more flow channels between each of the one or more fluid channels of the central shaft to corresponding ports of the one or more fluid ports of the housing, the seal assembly comprising a first stationary seal component physically contacting the interior surface of the housing adjacent to the first side of the first annular ring, a first rotating seal component physically contacting an exterior face of the central shaft, and one or more springs providing a force engaging a first sealing face of the first rotating seal component to a second sealing face of the first stationary seal component. In some cases, wherein a first distal end of the central shaft of the multiple channel rotary union comprises a face comprising at least one input port and at least one output port. In some cases, a second distal end of the rotary shaft of the multichannel rotary union is enclosed by the housing, wherein the second distal end defines a portion of a flow channel within the housing. In some cases, the seal assembly of the multiple channel rotary union may include a second stationary seal component physically contacting the interior surface of the housing adjacent to a first side of an annular ridge formed in the interior surface of the housing and a second rotating seal component physically contacting an exterior face of the central shaft, and wherein the one or more springs provide a force to seal a third sealing face of the second rotating seal component to a fourth sealing face of the second stationary seal component. In some cases, a first flow channel within the interior cavity of the housing is formed between an outer surface of the second stationary seal component and an upper face of the interior cavity of the housing, the upper face of the interior cavity of the housing being opposite to and spaced from a face of a distal end of the central shaft. In some cases, a second flow channel within the interior cavity of the housing is defined by a first surface of the first rotating seal component and a second surface of the second rotating component, wherein the first surface of the first rotating seal component contacts a first end of the one or more springs and the second surface of the second rotating seal component contacts a second end of the one or more springs. In some cases, a first fluid channel of the two or more fluid channels of the central shaft comprises a check valve. In some cases, a fluid channel of the check valve comprises a first channel having a first radius corresponding to a diameter of a ball component and one or more grooves machined parallel to a central axis of the check valve, the one or more grooves providing an additional flow volume to the check valve when open. In some cases, the housing comprises a first housing component and a second housing component, wherein the first housing component comprises a through bore aligned along a central axis of the housing and the second housing component comprises a partial bore aligned along the central axis of the housing, wherein the second housing component comprises a solid top surface. In some cases, the first housing component comprises a plurality of output ports and the second housing component comprises a plurality of inlet ports.

An illustrative dual flow channel rotary union may include a housing comprising a first housing section having a through bore aligned to a central axis of the housing and a second housing section having a partial bore aligned to the central axis of the housing, wherein the through bore of the first housing section and the partial bore of the second housing section form a central cavity of the housing a central shaft at least partially enclosed by the central cavity of the housing, wherein the central shaft comprises a first flow channel and a second flow channel, and wherein the first flow channel comprises a check valve. The dual flow channel rotary union may include a bearing physically secured within a first cavity section of the through bore and a central opening of the bearing is physically secured to a first section of the central shaft and a seal assembly comprising a first mechanical seal portion, a second mechanical seal portion, and a spring physically contacting the first mechanical seal portion and the second mechanical seal portion, wherein the first mechanical seal portion forms a first flow channel within the central cavity of the housing and between an inlet port of the second housing portion and an inlet port of the check valve and wherein the first mechanical seal portion and the second mechanical seal portion forms a second flow channel within the central cavity of the housing and between an outlet port of the central shaft and an outlet port of the second housing section These features, along with many others, are discussed in greater detail below.

BRIEF DESCRIPTION OF THE FIGURES

The foregoing and other objects, features, and advantages of the present disclosure set forth herein will be apparent from the following description of particular embodiments of those inventive concepts, as illustrated in the accompanying drawings. Also, in the drawings the like reference characters refer to the same parts throughout the different views. The present disclosure is illustrated by way of example and not limited in the accompanying figures in which like reference numerals indicate similar elements and in which:

FIGS. 7A-7C show views of a lower housing portion of the illustrative rotary union, according to aspects described herein;

FIGS. 8A and 8B show illustrative views of an upper housing portion of the illustrative rotary union, according to aspects described herein;

FIG. 8C shows a cross-sectional view A-A of the upper housing portion of the illustrative rotary union as shown in FIG. 8B, according to aspects described herein;

FIGS. 14A and 14B show side views of the shaft portion of the rotary union of FIG. 9, according to aspects described herein;

DETAILED DESCRIPTION

Figure 1:
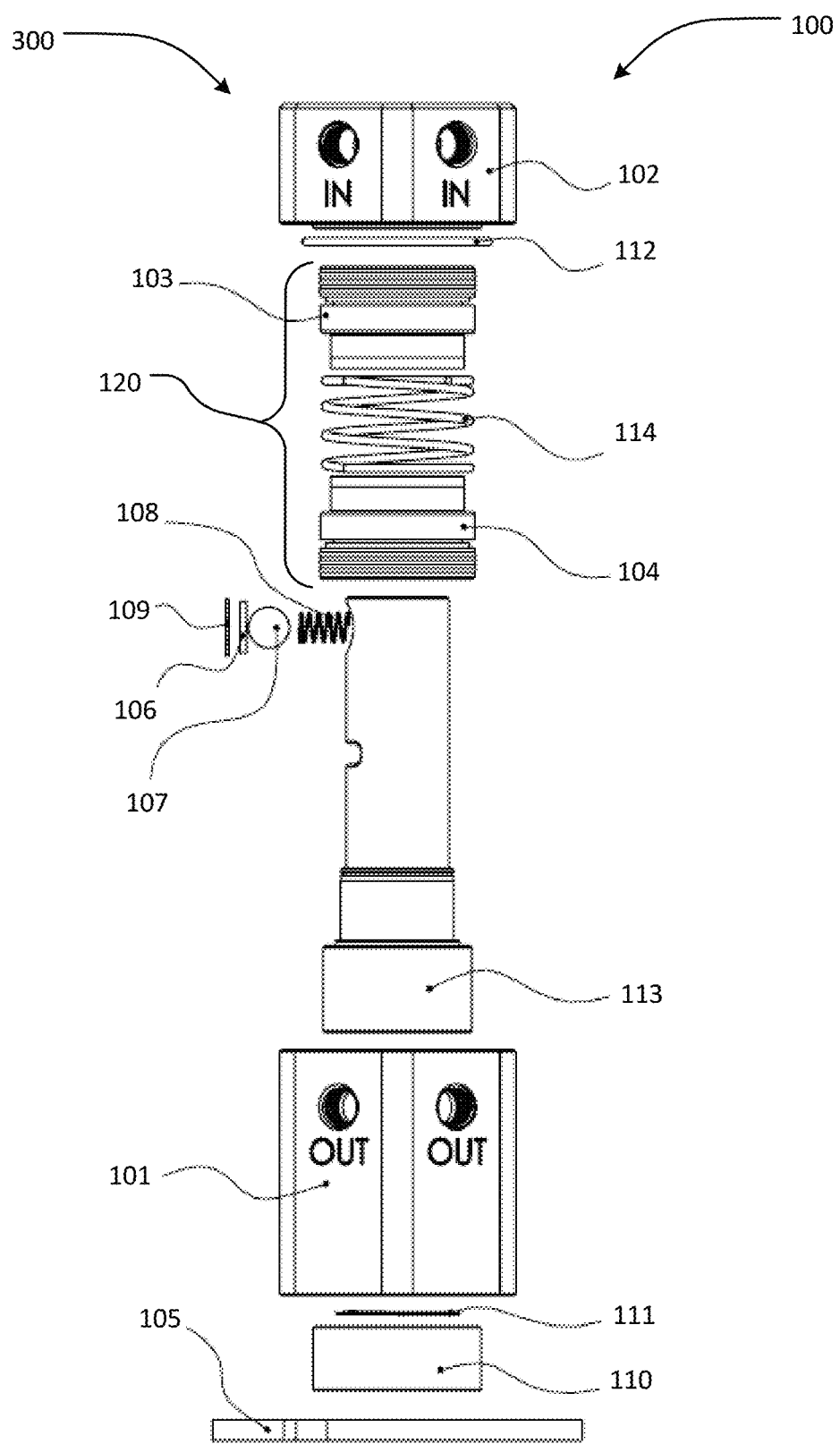
FIG. 1 shows an exploded view of an illustrative rotary union, according to aspects described herein.

In the following description of various illustrative embodiments, reference is made to the accompanying drawings, which form a part hereof, and in which is shown, by way of illustration, various embodiments in which aspects of the disclosure may be practiced. It is to be understood that other arrangements may be utilized, and structural and functional modifications may be made, without departing from the scope of the present disclosure. The drawings may not be shown to scale.

It is noted that various connections between elements are discussed in the following description. It is noted that these connections are general and, unless specified otherwise, may be direct or indirect, and that the specification is not intended to be limiting in this respect.

Water unions (e.g., rotary unions) used on many injection molding machines and other similar applications may include multiple bearings and two or more seals. Often, rotary unions may be designed for use with a specific fluid type or with one or more certain fluids (e.g., air, water, oil, etc.) but due to application changes and/or lack of existing products that provide needed functionality, these rotary unions may be installed for use with fluids that were not originally contemplated. For example, a rotary union designed for pneumatic or other gas-related applications may be installed to couple a water line from a stationary portion of a machine to a rotating portion.

Additionally, rotary unions may be subject to mechanical stresses when installed in certain applications, such as on a rotary table of an injection molding machine. Additionally, certain components of the rotary unions (e.g., bearings, seals, gaskets, and the like) may prematurely or unexpectedly fail due to mechanical stresses encountered during operation machines incorporating the rotary unions. For example, current rotary unions may not be designed to withstand prolonged exposure to mechanical stresses encountered when installed on a rotary table of an injection molding machine, such that gaskets, seals, or bearings may unexpectedly fail. Additionally, because the rotary unions may not be designed for use with a particular application, such as a rotary table of an injection molding machine), replacement of the rotary unions may be difficult and/or time consuming. For example, manifolds, brackets, flanges, and/or other mounting hardware may be custom made for each particular component and may need retooling or reattachment with a replacement.

Common failure points of present rotary unions may include bearings and/or seals. For example, the bearing of an installed rotary union may seize, be subject to wear, become pitted, or otherwise become inoperable over time. Additionally, one or more of the seals (e.g., an O-ring, a gasket, etc.) may fail over time causing fluid leaks. Indeed, such failures may cause extended downtime of the associated machine(s). Repairs may be time consuming and costly and may occur repeatedly due to a same rotary union type being re-installed, due to a lack of suitable replacements.

As such, a need has been recognized for an improved rotary union capable of withstanding the mechanical stresses involved with industrial applications (e.g., injection molding processes), while being easy to install and with an extended operational life.

FIG. 1 shows an exploded view 100 of an illustrative rotary union 300, according to aspects described herein. The rotary union 300 may be used on a stationary portion of a machine with a rotating frame of reference to facilitate fluid flow between a stationary portion of a machine to a moving portion of a machine having a rotating frame of reference. For example, an injection molding machine may include a stationary base and a rotating table upon which tooling may be installed. The tooling may require one or more fluids to facilitate proper operation, such as to provide cooling, forming, demolding, and/or other such capabilities. In some cases, the rotary union 300 may comprise a central portion and an outer housing portion. As such, the rotary union 300 may be installed on a machine such that the central portion may be fixed and the outer housing portion may be rotating. In other examples, the rotary union 300 may be installed such that the central portion is in the rotating frame of reference and the outer housing is within the fixed frame of reference of the machine. While the rotary union 300 is shown in the figures oriented such that a central axis is vertical, the rotary union is operational in any orientation.

The rotary union 300 may include multiple components as shown. For example, the rotary union may include a housing (e.g., a fixed combination of a first housing section (e.g., a lower housing 101) and a second housing section (e.g., an upper housing 102), a seal 120 comprising one or more components such as one or more seal components 103, 104, one or more springs (e.g., spring 114), a central shaft 113, one or more bearings 110, one or more retaining components (e.g., a retaining ring 111, retaining ring 109), one or more gaskets (e.g., an O-ring 112), one or more integrated check valves comprising one or more components such as a ball 107, a spring 108, a washer 106, and the retaining ring 109. In some cases, the rotary union 300 may include a flange 105. The flange 105 may be optionally installed, such as to facilitate installation of the rotary union 300 onto a machine.

The rotary union 300, when assembled, may include a rotating portion comprising a complete housing formed from a fixed mechanical connection of at least the first housing section (e.g., the lower housing 101) and the second housing section (e.g., the upper housing 102). In some cases, the rotating portion may further include the flange 105. A stationary portion of the rotary union 300 may include the central shaft 113. Fluid channels may be formed internally to the rotary union 300 to facilitate fluid flow. For example, the port housing may include inlet and/or outlet ports to facilitate fluid flow to and/or from the rotating frame of reference associated with a rotary table. The seal 120 may form one or more fluid channels as separate cavities portioned within a central cavity formed within the fixed mechanical connection of the first housing section (e.g., the lower housing 101) and the second housing section (e.g., the upper housing 102). For example, a first cavity (e.g., a volume) may be bounded by an interior surface of the first housing section (e.g., the lower housing 101), an exterior surface of the central shaft 113, and a portion of the seal 120 (e.g., a portion of the seal component 103). Similarly, a second cavity (e.g., a volume) may be bounded by an interior surface of the first housing section (e.g., the lower housing 101), an exterior surface of the central shaft 113, a portion of the seal 120 including portions of both the seal component 103 and the seal component 104.

Figure 2:
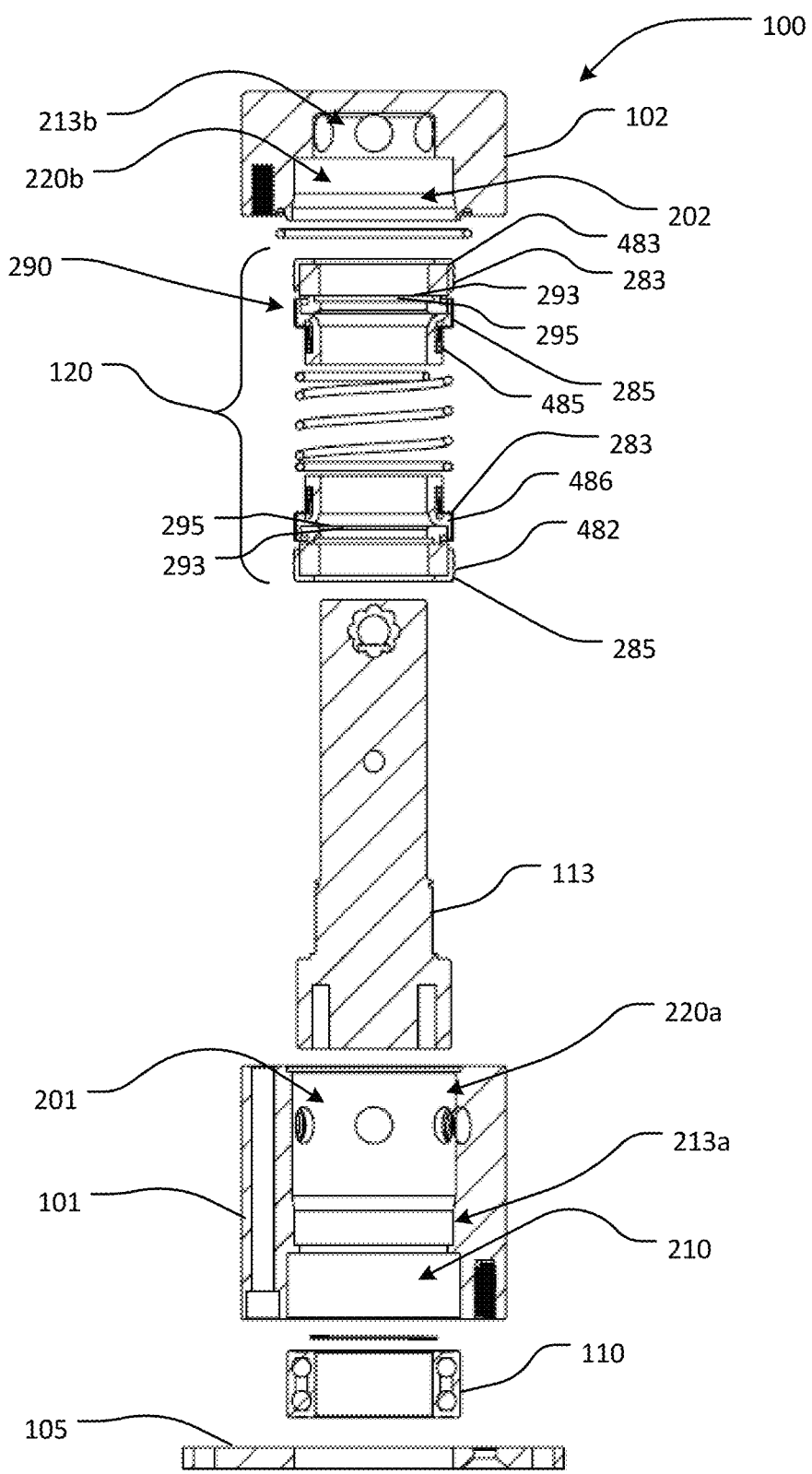
FIG. 2 shows a cross-section of the exploded view of the illustrative rotary union, according to aspects described herein.

FIG. 2 shows a cross-section of the exploded view of the illustrative rotary union 300, according to aspects described herein. Each of the lower housing 101, the upper housing 102, the seal assembly 120, the bearing 110, the retaining ring 111, and the flange 105 may each include a central opening through which at least a portion (e.g., portion 413 of FIG. 4) of the central shaft 113 may inserted and be enclosed. For example, the lower housing 101 includes the central cavity 202 and the upper housing 102 includes the central cavity 201. Additionally, each of the lower housing 101, the upper housing 102, the seal assembly 120, the bearing 110, the retaining ring 111, and the flange 105 may have a central axis aligned perpendicular to the central opening. Each central axis, when the lower housing 101, the upper housing 102, the seal assembly 120, the bearing 110, the retaining ring 111, and the flange 105 are assembled in the rotary union 300 may align with a central axis of the central shaft 113, such that the lower housing 101, the upper housing 102, the seal assembly 120, the bearing 110, the retaining ring 111, and the flange 105 are concentric with the central shaft 113.

The upper housing 102 encloses an interior cavity 202 formed within an interior surface of the upper housing 102. The interior cavity 202 may include a first cavity portion 213b and a second cavity portion 220b, where the first cavity portion 213b may be bounded by an interior surface of the upper housing 102 having a first radius centered on the central axis of the upper housing 102 and the second cavity portion 220b may be bounded by an interior surface of the upper housing 102 having a second radius centered on the central axis.

The lower housing 101 encloses an interior cavity 201 formed within an interior surface of the lower housing 101. The interior cavity 201 may include a first cavity portion 213a and a second cavity portion 220a, and a third cavity portion 210 where the first cavity portion 213a may be bounded by an interior surface of the lower housing 101 having a first radius centered on the central axis of the lower housing 101 and the second cavity portion 220a may be bounded by an interior surface of the lower housing 101 having a second radius centered on the central axis. The third cavity portion 210 may be bounded by an interior surface of the lower housing 101 having a third radius centered on the central axis. The first radius, the second radius, and the third radius may be different dimensions.

The rotary union 300 may include a seal assembly 120 that includes one or more seal components. In some cases, the seal assembly 120 may include multiple seals or seal components collectively comprising the seal assembly. In some cases, a seal assembly 120 may include multiple mechanical seals, such as when multiple fluid channels are provided. In an illustrative example, the seal 120 may be a mechanical seal that provides fluid containment between a rotating part and a stationary part. The seal assembly 120 may include a circular opening centered on the central axis and having a radius substantially similar to a radius of the central shaft 113 at a predefined tolerance.

Figure 3:
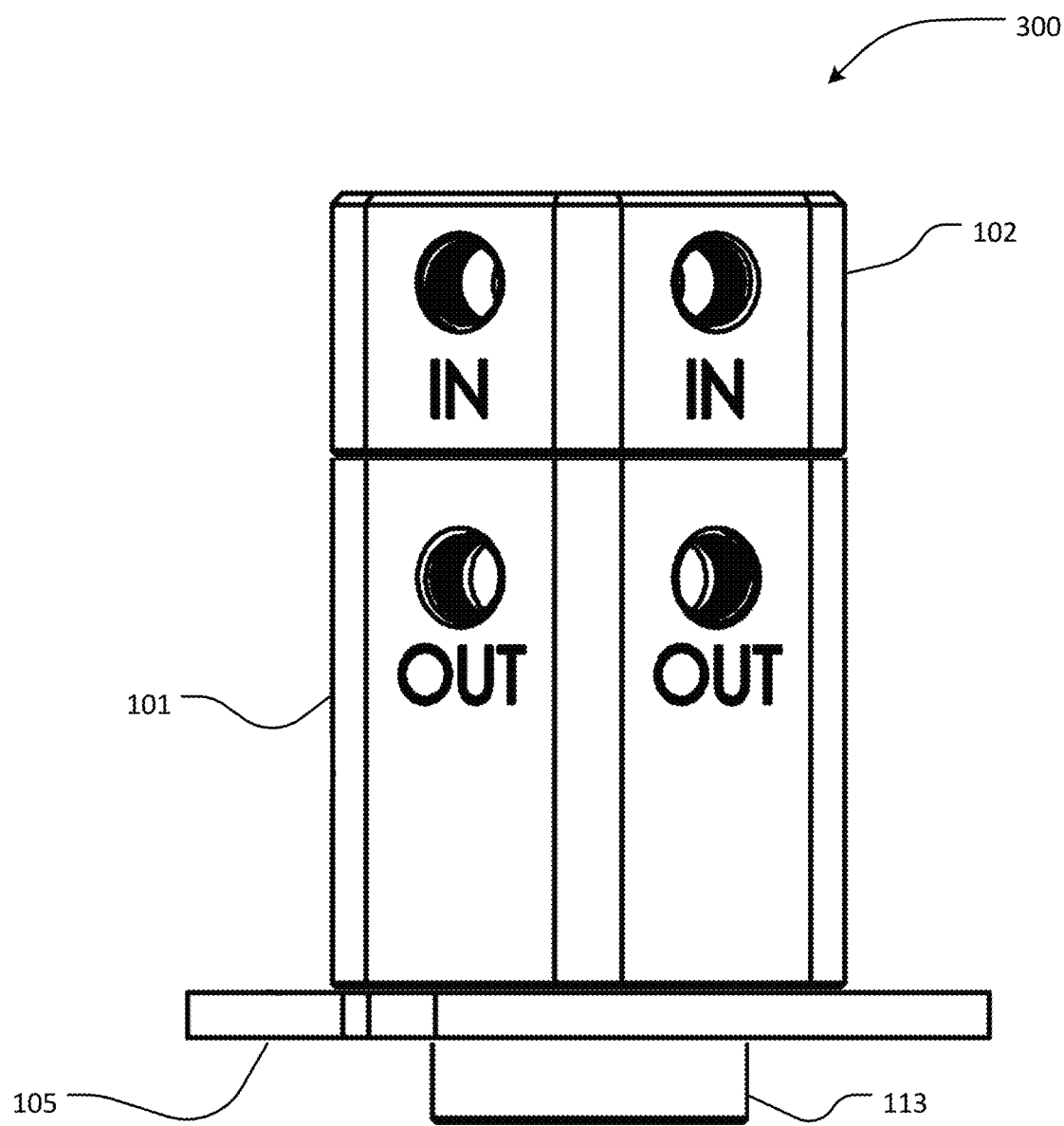
FIG. 3 shows side view of the illustrative rotary union, according to aspects described herein.

As shown in FIGS. 2 and 3, in some cases, the seal assembly 120 may include multiple sealing components 482, 483, 485, 486, and 290 made of one or more materials, such as ceramic materials, carbon materials (e.g., graphite), flexible materials (e.g., Kratom, a nitrile compound, natural rubber, etc.), and the like. For example, the seal assembly 120 may include a first seal component (e.g., a rotating component 485) comprising a gasket 285 formed from a flexible material physically encircling a portion of the central shaft to provide a fluid seal about the surface of the central shaft, a second seal component (e.g., a stationary component 483) comprising a gasket 283 formed from a flexible material physically adjacent an interior surface of the housing and providing a fluid seal at the housing, and a third seal component 290 comprising a stationary seal component 483 and a rotating seal component 485. A face of the rotating seal component 485 may physically abut a face of the stationary seal component 483 providing a fluid seal within a cavity of the housing, such that physical contact of a rotating face meeting a stationary face provides the fluid seal. In some cases, the seal assembly 120 may include one or more single-sided and/or double-sided pump seals. An advantage of using seals such as those discussed above, is that contaminants and/or particulates suspended in a fluid flowing through the rotary union 300 causes little to no damage to the seals and wear to the moving seal components is minimized.

The seal assembly 120 may include one or more stationary portions that may fit inside a cavity of a portion of the housing. For example, a first stationary portion of the seal assembly 120 may be enclosed within the cavity 220a within the lower housing 101 and a second stationary portion of the seal assembly 120 may be enclosed within the cavity 220b of the upper housing 102. The cavities 220a and 220b may be machined with a radius substantially similar to an exterior radius of the stationary portion of the seal 120 such as to provide a frictional fit within a defined tolerance (e.g., a press fit, a driving fit, a forced fit and the like). In some cases, the stationary portion(s) of the seal assembly 120 may be threaded and the cavity 220a and 220b may include a contiguous inner surface. In some cases, the interior portion of the cavity 220a and 220b may include corresponding threads configured to provide a mechanical connection between the stationary portion of the seal 120 and the upper housing 102 and between another stationary portion of the seal 120 and the lower housing 101.

FIG. 3 shows side view of the illustrative rotary union 300, according to aspects described herein. The exterior of the rotary union 300 may be formed from the upper housing 102, the lower housing 101, and the central shaft 113. The flange 105 may be optionally attached to the lower housing and surrounding the central shaft 113. In some cases, a separate flange may be used or may be integrated into a rotating surface upon which the rotary union is installed.

Figure 4:
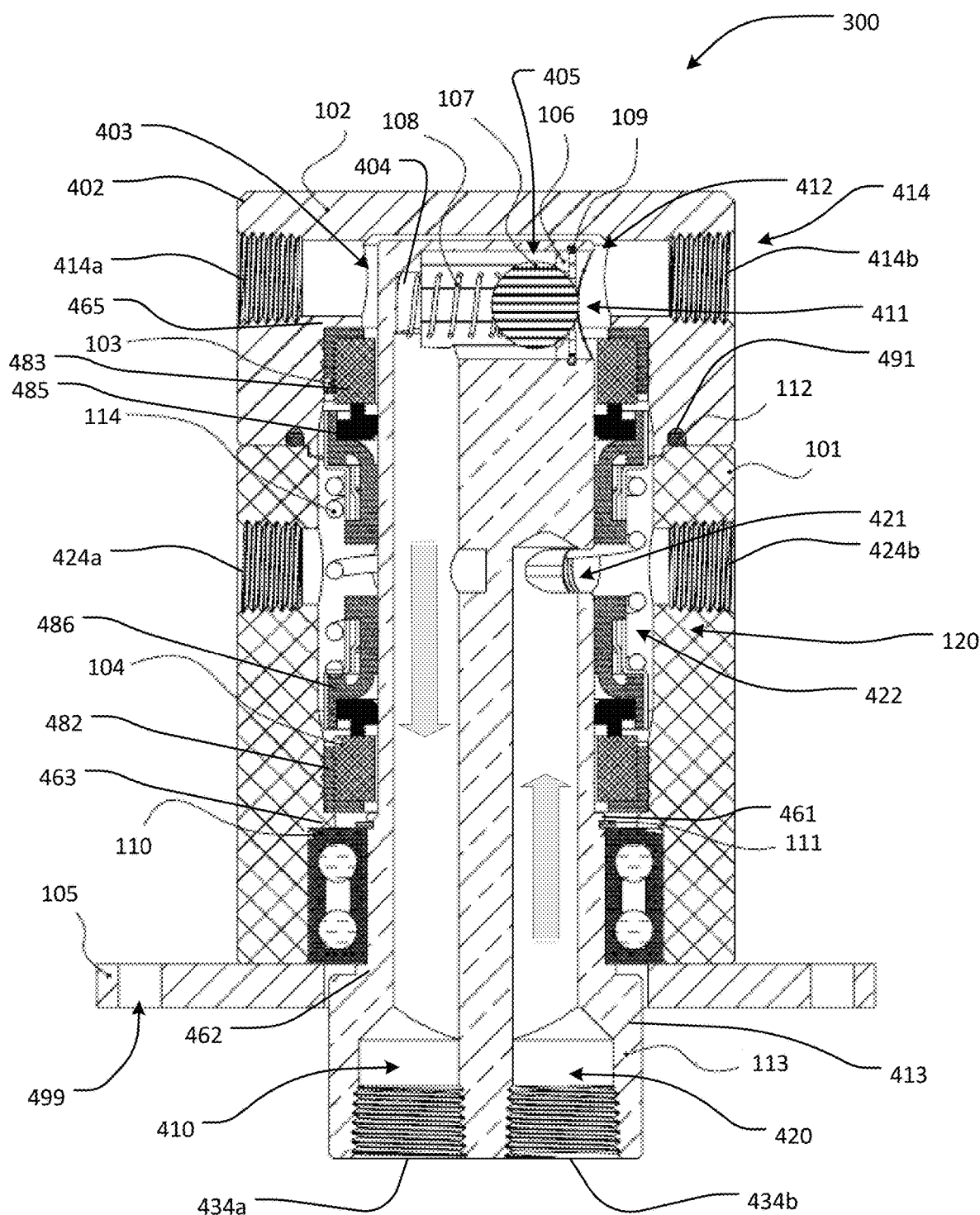
FIG. 4 shows a cross-sectional view of the illustrative rotary union, according to aspects described herein.

FIG. 4 shows a cross-sectional view of the illustrative rotary union 300. A housing 402 of the rotary union 400 is formed through a mechanical connection between the lower housing 101 and the upper housing 102 and, optionally, the flange 105. In some cases, the lower housing 101 and the upper housing 102 may be attached via mechanical fasteners, via welding along a seam between the upper housing 102 and the lower housing 101. The upper housing 102 and the lower housing 101 may be formed (e.g., machined) from a metallic material, such as stainless steel, brass, and/or the like. A circular groove 491 centered on the central axis may be formed in a bottom surface of the upper housing 102. Alternatively, the circular groove 491 may be formed in an upper surface of the lower housing 101. The O-ring 112 may be fit within the circular groove 491 to provide fluid seal for a seam between the upper housing 102 and the lower housing 101.

The housing 402 may surround the central shaft 113, which is positioned within an interior cavity 403. Additionally, the housing 402 may be rotatably connected to the central shaft 113, such as via the bearing 110 and the seal 120. The seal 120 may form one or more cavities between an interior surface of the housing and an exterior surface of the central shaft 113. One or more fluid flow channels may be formed within these cavities to facilitate fluid flow to and from the rotary union 300.

The housing 402 of the rotary union 300 may be connected to a rotating portion of a machine via openings 499 in the flange 105. In such cases, the flange may be physically secured or otherwise attached to the housing 402, where the central shaft 113 is axially aligned with the housing 402 and extends through a central opening of the flange 105 into the interior cavity 403 of the housing 402. When affixed to the rotating surface (e.g., a rotary table), the housing 402 may continuously and/or freely rotate in either a clockwise or counter-clockwise direction. The central shaft 113 may be physically attached to a stationary portion of the machine, for example, via fluid connectors physically attached to one or more fluid ports (e.g., fluid port 434a, fluid port 434b, etc.). In some cases, the fluid ports 434a and 434b threadedly engage fluid couplings. The central shaft 113 remains in a fixed position and the housing 402 rotates about the central longitudinal axis extending along a centerline of the housing and a centerline of the central shaft 113.

Fluid port 434b may be fluidly connected to a stationary flow channel 420 extending longitudinally through the central shaft 113 to an inner fluid outlet 421 that is fluidly connected to one or more rotating fluid ports (e.g., fluid outlet port 424a, fluid inlet port 424b) via a connecting cavity (e.g., the outlet flow channel 422) within the housing 402. Similarly, fluid port 434a may be fluidly connected to a stationary flow channel 410 extending longitudinally through the central shaft 113 to an inner fluid inlet 411 that is fluidly connected to one or more rotating fluid ports (e.g., fluid inlet port 414a, fluid inlet port 414b) that is fluidly connected to one or more rotating fluid ports (e.g., fluid inlet port 414a, fluid inlet port 414b) via a connecting cavity (e.g., the outlet flow channel 422) within the housing 402. In some cases, a check valve 405 may be integrated into the inner fluid inlet 411 to ensure proper fluid flow to and from the rotating frame of reference. The check valve 405 may include the spring 108 physically engaging a feature 404 within the flow channel 410 and providing physical pressure to the ball 107 to ensure physical contact between the ball 107 and the washer 106 and/or the retaining ring 109.

Here, fluid flow is discussed with reference to the rotating frame of reference. The rotary union 300 may include one or more inlet ports 414a, 414b. For example, the illustrative upper housing section 102 includes six inlet ports. The rotary union 300 is operational with fluid lines connected to one or all of the inlet ports, where unused ports may be sealed or otherwise plugged. Similarly, the rotary union may include one or more outlet ports 424a, 424b, where the rotary union 300 is operational with fluid lines connected to one or all of the inlet ports, where unused ports may be sealed or otherwise plugged.

As mentioned above, the housing 402 may be rotatably connected to the central shaft 113 via the bearing 110. For extended housing configurations, such as to facilitate additional flow channels through the central shaft 113, additional bearings may be located within the housing, such as at a midpoint of the central shaft 113. In some cases, the bearing 110 may be a sealed assembly of a particular type. For example, the bearing 110 may be a double row ball bearing assembly or other sealed bearing assembly. Other bearing types may include a single row ball bearing assembly, or other ball bearing assembly, a roller bearing assembly, a mounted bearing assembly, and/or the like. An inner surface of the bearing 110 may be positioned adjacent to the central shaft 113 where the seal 120 is captured between an annular shelf 462 formed on the outer surface of the central shaft and the retaining ring 111 that may be secured within an annular groove 461. An outer surface of the bearing 110 may be positioned adjacent to the inner surface of the lower housing 101, and positioned such that at least a portion of the upper surface of the bearing 110 meets an annular ring 463 formed on the inner surface of the lower housing. A portion of a lower surface of the bearing 110 may physically abut an upper surface of the flange 105.

The housing 402 may enclose one or more flow channels such as an inlet flow channel 412 and an outlet flow channel 422. The outlet flow channel 422 may facilitate fluid flow from outward from the inner fluid outlet 421 to the one or more rotating fluid outlet ports, such as the outlet ports 424a and 424b. Similarly, the inlet flow channel 412 may facilitate fluid flow inward from the inlet ports 414a and 414b to the inner fluid inlet. The inlet flow channel 412 and the outlet flow channel 422 may be formed in a cavity between the inner surface of the housing 402, the outer surface of the central shaft and one or more surfaces of the seal 120. Each of the inlet ports 414 are fluidly coupled to a same inlet flow channel 412 and each of the one or more outlet ports 424 are fluidly coupled to a same outlet flow channel 412.

The seal 120 may form one or more interior flow channels within the housing 402, such as the inlet flow channel 412 and the outlet flow channel 422. In some cases, the seal 120 may be a mechanical seal designed to prevent fluid flow around a rotating shaft, such as a pump seal. The seal 120 may be configured as a single seal, or a double seal. In some cases, a seal assembly 120 may be formed from multiple seals, such as a combination of single seals, double seals, or single and double seals. In the illustrative example of FIG. 4, the seal assembly 120 is a double seal. A double seal may comprise two mechanical seal assemblies (e.g., seal components 103 and 104) positioned back to back with an internal spring 114 providing a loading force to engage the seal faces. The space internal to the two sets of seal faces can be hydraulically pressurized, such as with fluid flowing out of the one or more outlet ports 424. This fluid may provide lubrication for the seal faces. The seal assembly 120 may be used with a wide range of fluids having different viscosities, pressures and/or temperatures. Additionally, other seal types may be used such as tandem seals, cartridge seals, and the like.

The seal assembly 120 may comprise multiple components, such as the aforementioned seal components 103 and 104 and the spring 114. The seal components 103 and 104 may further comprise a stationary component and a rotating component. For example, the seal component 103 may include the stationary component 483 and the rotating component 485. Similarly, the seal component 103 may include the stationary component 482 and the rotating component 486. Each of the paired stationary component 483 and the rotating component 485 and the paired stationary component 482 and the rotating component 486 comprise a pair of optically flat, highly polished faces.

The stationary components 482 and 483 are physically affixed to a corresponding housing section. For example, the stationary components 482 and 483 may be physically abut the interior surface of the housing and/or an exterior surface of the rotating shaft. In some cases, the stationary components may not physically contact the rotating shaft. In some cases, the stationary components 482 and 483 of the seal 120 may be threadedly connected to the housing. In some cases, the stationary components 482 and 483 of the seal 120 may press against the interior surface of the housing 402 with a specified fit, such as a transition fit (e.g., a similar fit, a fixed fit, or the like), an interference fit (e.g., a press fit) or the like. In some cases, the stationary components 482, 483 may clear the exterior surface of the central shaft 113 such as with a clearance fit (e.g., a close running fit, a sliding fit, a locational clearance fit and the like). In some cases, the fit may be determined based on a type of the seal 120 being used.

The rotating components 485 and 486 may physically contact the exterior surface of the central shaft 113, such as with a first fit (e.g., a frictional fit), and may physically clear the interior surface of the housing 402, where the fit and/or minimum clearance is defined based on a type of the seal 120. The spring 114 may provide a longitudinal force to engage the faces of the stationary components 482 and 483 against corresponding faces of the rotating components 486 and 485. Loading of the spring 114 may be enforced via spacing of the stationary components, such as via physical features formed into the interior of the housing 402, such as a change in radius, such as the step 465 that the stationary component 483 may physically contact and the annular ring 463 that the stationary component 482 may physically contact.

The inlet flow channel 412 may be formed within an interior cavity 403 of the housing 402 and bounded by the interior surface of the housing 402, the exterior surface of the central shaft 113, and an outward facing surface of the stationary component 483 of the seal 120. The inlet flow channel 412 may further include a void between a distal face of the central shaft and an internal surface of the housing opposite a top face. The outlet flow channel 422 may also be formed within an interior cavity 403 of the housing 402 and bounded by the interior surface of the housing 402, the exterior surface of the central shaft 113, and an inward facing surface of the rotating component 485 and the inward facing surface of the rotating component 486. The spring 114 may be wholly contained within the outlet flow channel 422.

Figures 5A, 5B:
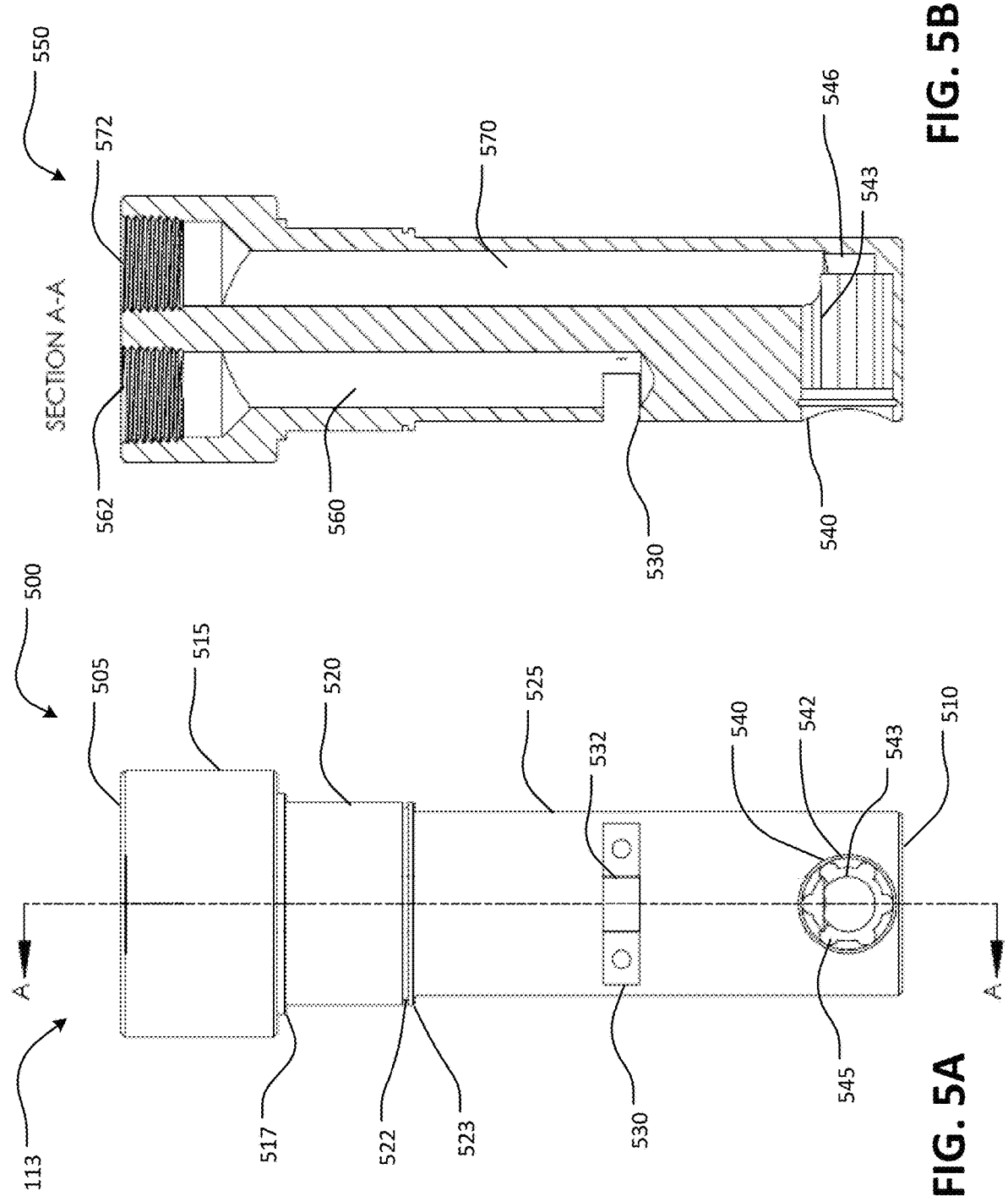
FIG. 5A shows a side view of a shaft portion of the illustrative rotary union, according to aspects described herein.
FIG. 5B shows a cross-sectional view of the shaft portion of the illustrative rotary union, according to aspects described herein.

FIG. 5A shows a side view 500 of a shaft portion of the illustrative rotary union 300 and FIG. 5B shows a cross-sectional view 550 of the shaft portion of the illustrative rotary union 300. The central shaft 113 may include a top distal surface 510 and a bottom distal surface 505, where the top distal surface is positioned within the housing 402 near a top surface of an interior cavity of the housing 402, as shown in FIG. 4. The bottom surface (e.g., the bottom distal surface 505) includes the fluid inlet port 562 and the fluid outlet port 572, when referenced to the stationary frame of reference of the central shaft. In FIG. 4, the fluid inlet port 434a and the fluid outlet port 434b are named in reference to the rotating frame of reference. For example, fluid flow enters the central shaft via the fluid inlet port 562 and exits the central shaft via the fluid channel 560 and the inner fluid outlet (e.g., a fluid outlet port 530). Similarly, fluid flow enters the central shaft 113 via the inner fluid inlet (e.g., the fluid inlet port 540) and exits the central shaft via the fluid channel 570 and the fluid outlet port 572.

The central shaft 113 may have multiple sections defined by different radii, such as a first section 515, a second section 520, and a third section 525. The first section 515 may have a first radius machined to provide a clearance fit between a central opening of the flange 105 and a central opening of the lower housing 10. A step feature 517 may be positioned between the first section 515 and the second section 520. The second section 520 may have a radius less than the radius of the first section and within a defined tolerance with respect to a radius of an inner surface of the bearing 110. The radius of the step feature 517 may be greater than the radius of the second section 520 such that a bottom surface of the bearing 110 rests upon an upper surface of the step feature 517, where the step feature 517 provides spacing between the bottom surface of the bearing 110 and the first section 515 of the central shaft 113.

The third section 525 of the central shaft 113 has a third radius that is less than the radius of the second section 520. The radius of the third section 525 is within a first defined tolerance with respect to a radius of an inner surface of the rotating components 485 and 486 of the seal 120 and/or within a second defined tolerance with respect to a radius of an inner surface of the stationary components 483 and 482. A groove 522 may be formed between the second section 520 and an annular ring 523, where the retaining ring 111 is positioned to secure the bearing 110 onto the central shaft 113.

Fluid outlet port 530 may be formed into the cylindrical central shaft 113 with a substantially rectangular cross section, where one or more internal openings 532 facilitate fluid flow out of the central shaft. A fluid inlet port 540 may be formed towards the distal end of the central shaft on a surface perpendicular to upper surface (e.g., a top distal surface 510). The fluid inlet port 540 may include a central bore 543 having a diameter within a defined tolerance of a diameter of the ball 107. An outer bore of the fluid inlet port 540 may be machined to a depth such that the washer 106 and the retaining ring 109 can secure the ball 107 within the central bore 543. When installed, the ball 107 forms a fluid seal against the washer 106 to prevent fluid flow in an opposite direction. Within the fluid inlet port 540, multiple grooves 545 (e.g., 84 grooves, 6 grooves in a "star" pattern, 8 grooves, 12 grooves, etc.) machined between the central bore and the outer bore. When the check valve is in a closed position, the with the ball 107 positioned against the washer 106 and/or retaining ring 109, flow into the fluid channel 570 is stopped. Once the check valve has been activated based on a defined fluid flow pressure, the multiple grooves are fluidly engaged with the fluid inlet port 540 such that a volume of water flowing into the fluid channel 560 is substantially similar to a fluid flow without a check valve being positioned in the fluid inlet port 540.

Figure 6B:
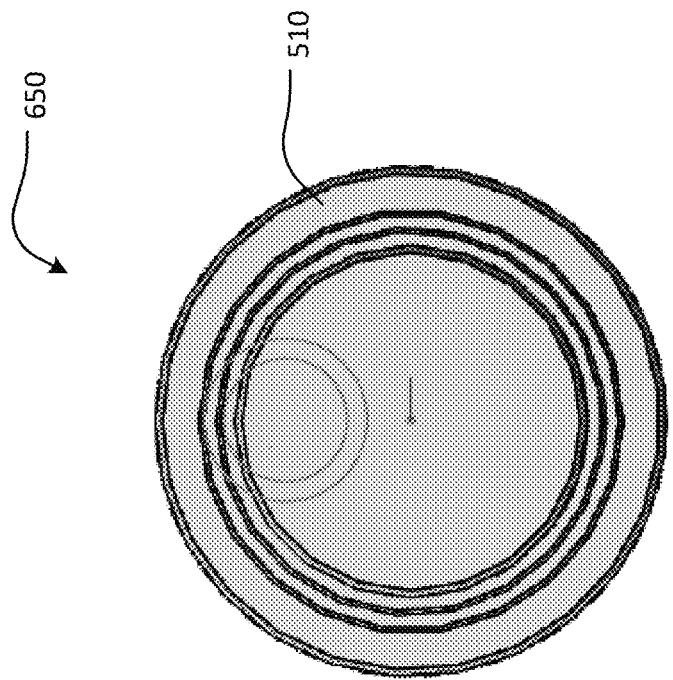
FIGS. 6A and 6B show opposing end views of the shaft portion of the illustrative rotary union, according to aspects described herein.
Figure 6A:
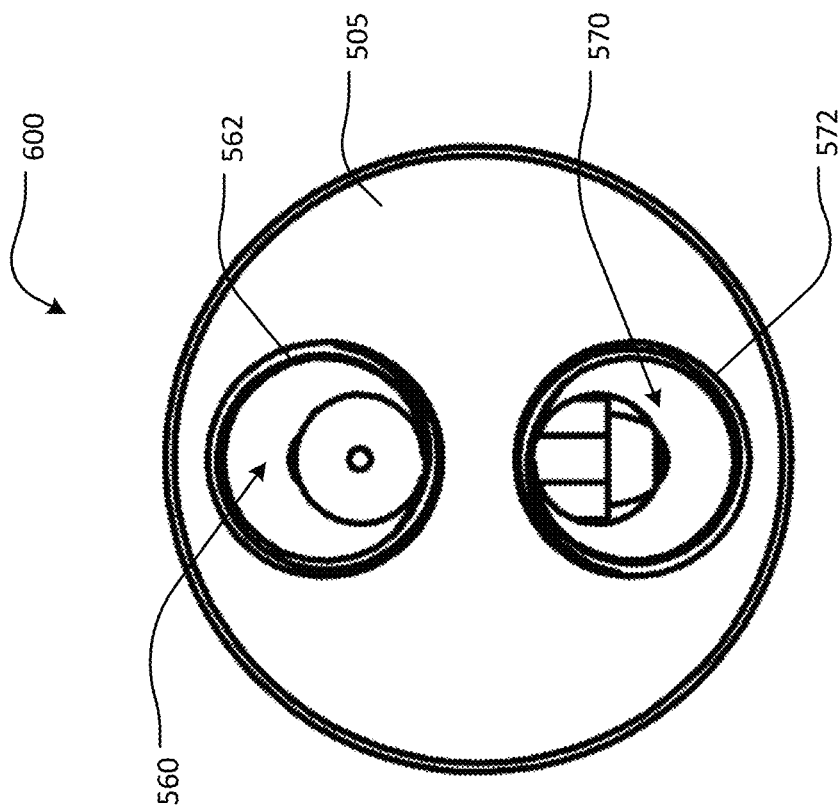

FIGS. 6A and 6B show opposing end views 600 and 650 of the central shaft 113 of the illustrative rotary union 300. The top distal surface 510 shown in FIG. 6B may be smooth or contoured to facilitate fluid flow within the inlet flow channel 412. The bottom distal surface 505, shown in FIG. 6A includes two fluid ports (e.g., a fluid outlet port 572 and the fluid inlet port 562 that may be machined (e.g., threaded) to facilitate connection with a fluid delivery system (e.g., a hose or other fluid delivery mechanism).

Figure 7D:
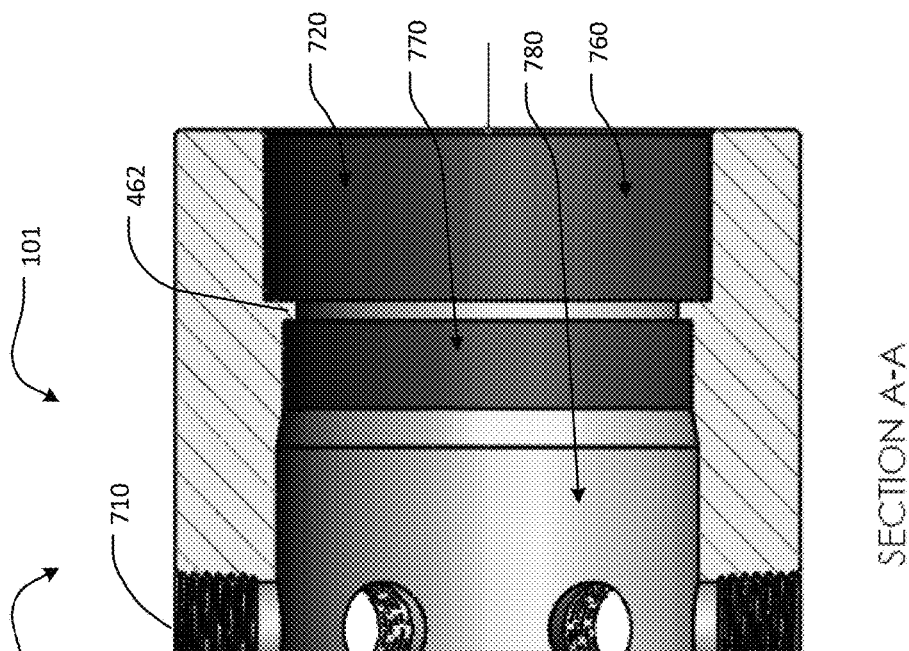
FIG. 7D shows a cross-sectional view of the lower housing portion of the illustrative rotary union, according to aspects described herein.
Figure 7C:
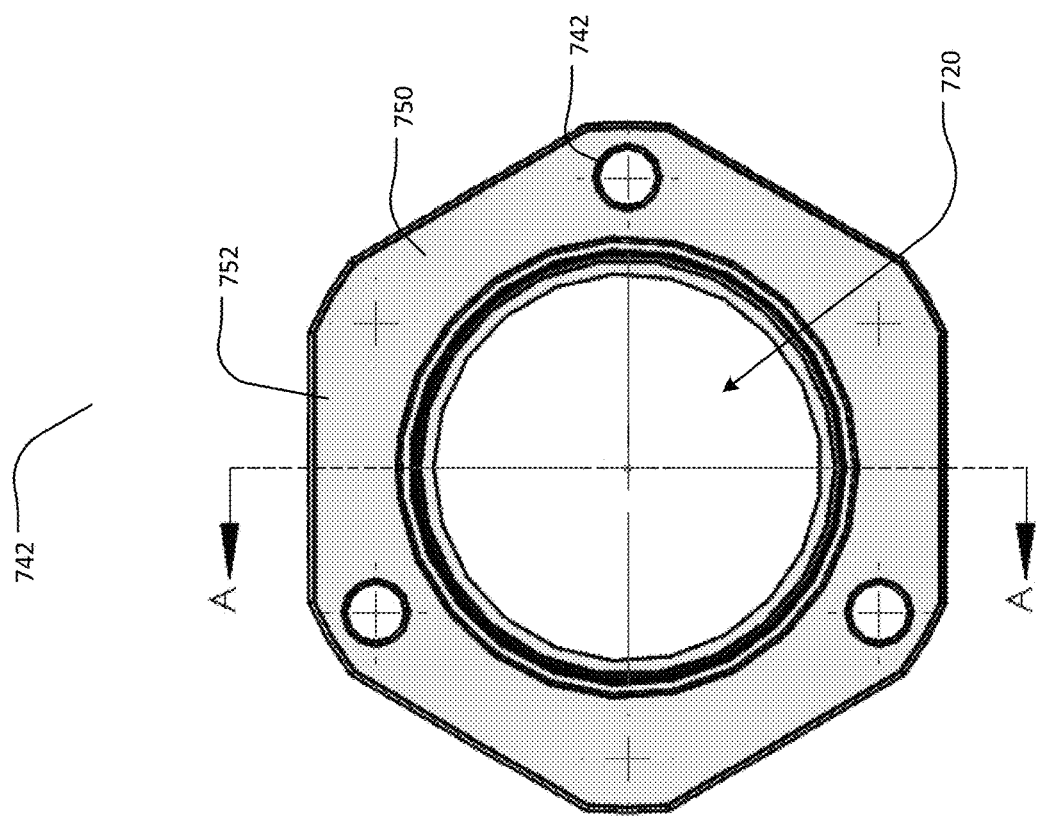

FIG. 7A shows a bottom view of the lower housing 101, FIG. 7B shows a side view of the lower housing 101, and FIG. 7C shows a top view of the lower housing 101. FIG. 7D shows a cross-sectional view A-A of the lower housing 101 of the illustrative rotary union 300, as referenced to FIG. 7C.

In FIG. 7A, a bottom surface (e.g., a surface 730) of the lower housing 101 includes one or more through holes (e.g., the through hole 742) and one or more threaded openings (e.g., the threaded opening 732) machined into a side wall of the lower housing 101, a central bore 720 may be centered on a central axis and may include a first diameter at the lower surface 730. As shown in FIG. 7B, the lower housing may have a polygonal shape (e.g., a hexagon, a dodecahedron, and the like) where one or more side faces 712 of the lower housing 101 may include an outlet bore 710 through the side wall of the lower housing 101. In some cases, the lower housing may be cylindrical or may have another polygonal shape. In FIG. 7C, the top face 750 of the lower housing 101 may include multiple (e.g., 3 or more) pass through openings (e.g., the through hole 742) through the side wall and the central opening to the central bore 720 centered on the central axis, where central opening of the top face has a second diameter that may be the same as or different than the first diameter of the central opening on the lower surface 730. FIG. 7D shows a cross section 701 of the lower housing 101 showing a profile of the central opening, where the central cavity includes a first cylindrical cavity 760 having a first diameter, a second cylindrical cavity 770 having a second diameter and a third cylindrical cavity 780 having a third diameter. For example, the first diameter of the first cylindrical cavity may correspond to a diameter of an outer surface of the bearing 110 within a selected tolerance range. The second diameter of the second cylindrical cavity 770 may correspond to a diameter of an outer surface of the stationary component 482 of the seal 120 within a selected tolerance range. The third diameter of the third cylindrical cavity 780 may have a diameter greater than an outer diameter of the stationary component 482, the rotating component 486 and the spring 114 of the seal.

Figure 8A:
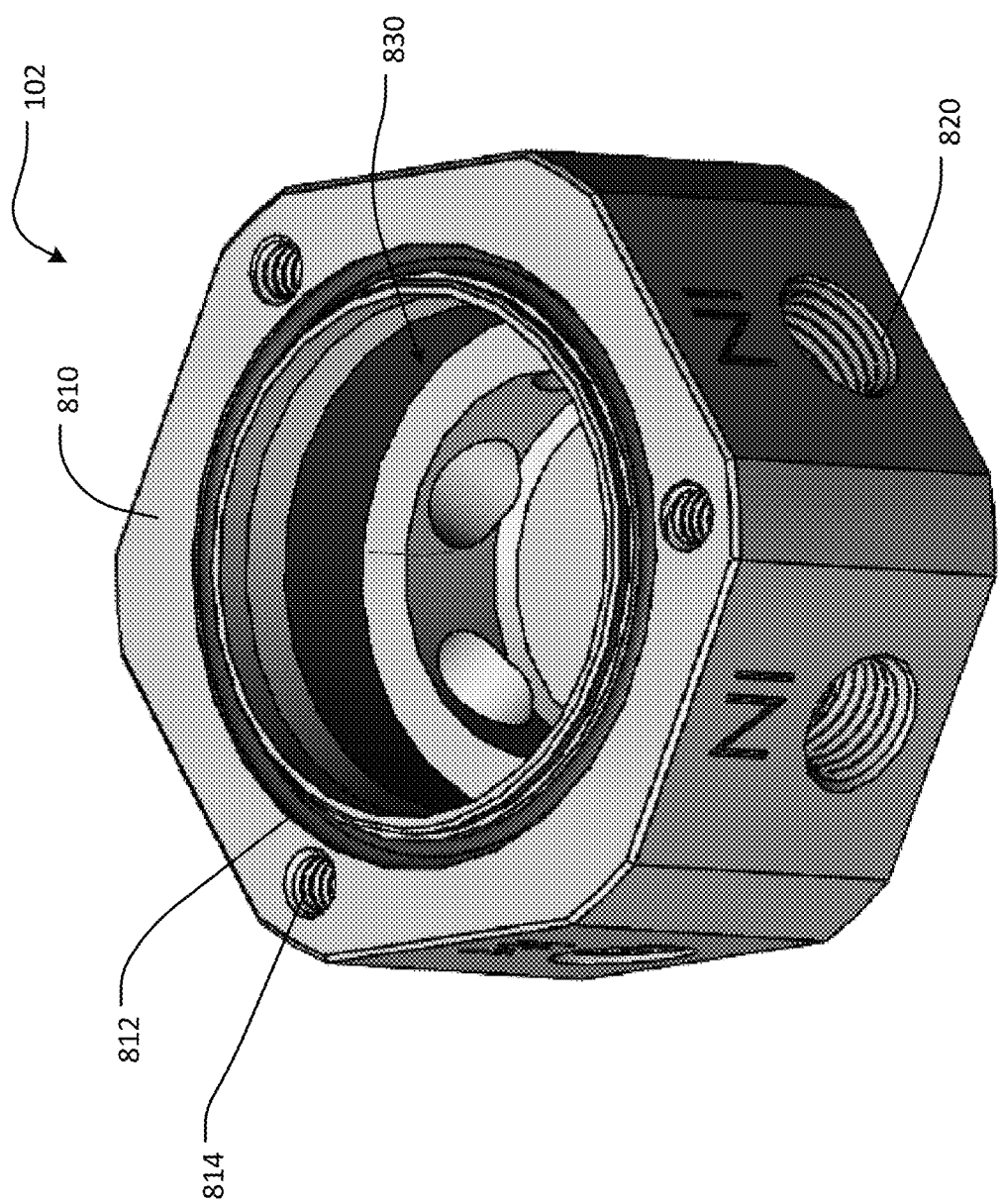

FIG. 8A shows a perspective view towards the bottom surface of the upper housing 102, FIG. 8B shows a bottom view of the upper housing 102, and FIG. 8C shows a cross-sectional view of the upper housing 102 of the illustrative rotary union 300. As shown in FIGS. 8A and 8B, a lower surface 810 of the upper housing 102 may include a circular groove 812 into which the O-ring 112 (e.g., a Viton O-ring) may be inserted to facilitate a seal between the upper surface 752 of the lower housing 101 and the lower surface 810 of the upper housing 102. The lower surface 810 of the upper housing 102 may include multiple threaded holes (e.g., threaded hole 814) that may each align with a corresponding through hole 742 of the lower housing 101 to allow for a mechanical connection between the lower housing 101 and the upper housing 102 via a threaded fastener. In some cases, the threaded fastener may further be used to connect the housing 402 to a rotating fixture, such as a rotary table. In some cases, the upper housing 102 may be welded or otherwise physically connected (e.g., via adhesives) to the lower housing 101. A central cavity 830 of the upper housing 102 may be accessible via a central opening centered on a central axis in the lower surface 810 of the upper housing 102. The central cavity 830 may be fluidly coupled to one or more inlet ports 820 and to the central cavity of the lower housing 101 when assembled.

As shown in FIG. 8C, the central cavity 830 may include a first cylindrical cavity 840 generally having a first radius, a second cylindrical cavity 850 having a second radius, and a third cylindrical cavity 860 having a third radius. For example, the first diameter of the first cylindrical cavity 840 may have a diameter greater than an outer diameter of the stationary component 483, the rotary component 485 and the spring 114 of the seal 120. The second diameter of the second cylindrical cavity 850 may correspond to a diameter of an outer surface of the stationary component 483 of the seal 120 within a selected tolerance range. The third diameter of the third cylindrical cavity 780 may have a diameter greater than an outer diameter of the distal end of the central shaft and may include space between the upper surface of the central shaft and the inner surface of the lower housing opposite the central opening to the central cavity 830. The third cylindrical cavity 830 is in fluid communication with the inlet ports 820 and the inner inlet 411 of the central shaft 113 when assembled.

In some cases, the rotary union may be assembled by aligning a central opening of the bearing 110 with a central axis of the central shaft 113 and positioning a bottom surface of the bearing 110 to physically abut the step feature 517 and securing the bearing 110 to the central shaft 113 by inserting the retaining clip 111 into the groove 522. The spring 108 may be inserted and secured into a groove 546 within the central bore 543. The ball 107 may be inserted into the central bore 543 of the fluid inlet port 540 and secured by inserting the washer 106 and the retaining ring 109. Next, the central axis of the central shaft 113 may be aligned with the central bore of the lower housing 101, such that the upper surface of the bearing 110 abuts a lower edge of the annular ring 463. In some cases, the central shaft may be retained in the lower housing 101 by mechanically attaching the flange 105 to the lower housing 101 using mechanical fasteners inserted into and secured to the threaded openings 732.

Next, the seal assembly 120 may be assembled onto the central shaft 113. For example, a central opening of the stationary component 482 of the seal assembly 120 may be aligned with the central axis of the central shaft 113, and positioned along the central shaft 113 so that a stationary seal portion stationary component 482 such that a gasket (e.g., the gasket 285) is frictionally fit to an interior surface of the lower housing 101 and abuts an upper edge of the annular ring 463, where an inner surface of the stationary component 482 is spaced from the exterior surface of the central shaft. A central opening of the rotating component 486 may then be aligned with the central axis of the central shaft 113 and positioned on the central shaft, such that a gasket 285 is frictionally fit to the exterior surface of the central shaft and positioned such that surfaces (e.g., faces 293 and 295) of the stationary component 282 and the rotary component 286 physically and rotatably contact. The central axis of the spring 114 is then aligned with the central axis of the central shaft 113 and positioned such that a first distal end contacts an upper surface of the rotary component 286.

Next, a central opening of the second rotary component 485 is aligned with a central axis of the central shaft 113, and positioned such that the lower surface of the second rotary component 485 physically abuts the spring and a gasket of the rotating component 485 is frictionally fit to the outer surface of the central shaft 113 providing a fluid seal. The second rotary component 485 is positioned on the central shaft 113 between the fluid inlet port 540 and the fluid outlet port 530. The upper edge of the rotary component 485 may extend beyond the upper surface of the lower housing 101 Next the O-ring 112 may be inserted and secured within the circular groove 812 within the lower surface 810 of the upper housing 102. Next, a central opening of the stationary component 483 may be aligned with the central axis of the central shaft 113 and inserted over the central shaft to so that the faces 293 and 295 of the stationary component 483 and the rotary component 485 are rotatably contacting and an interior surface of the stationary component 483 is spaced from an exterior surface of the central shaft 113. Next, the threaded holes 814 of the lower surface 810 of the upper housing 102 are aligned with corresponding through holes 742 of the lower housing 101 to facilitate a mechanical connection between the lower housing 101 and the upper housing 102, where a fluid seal between the housing components is provided by the O-ring 112. In some cases, at least a portion of the seam between the lower housing and the upper housing may be sealed by welding.

Figure 9:
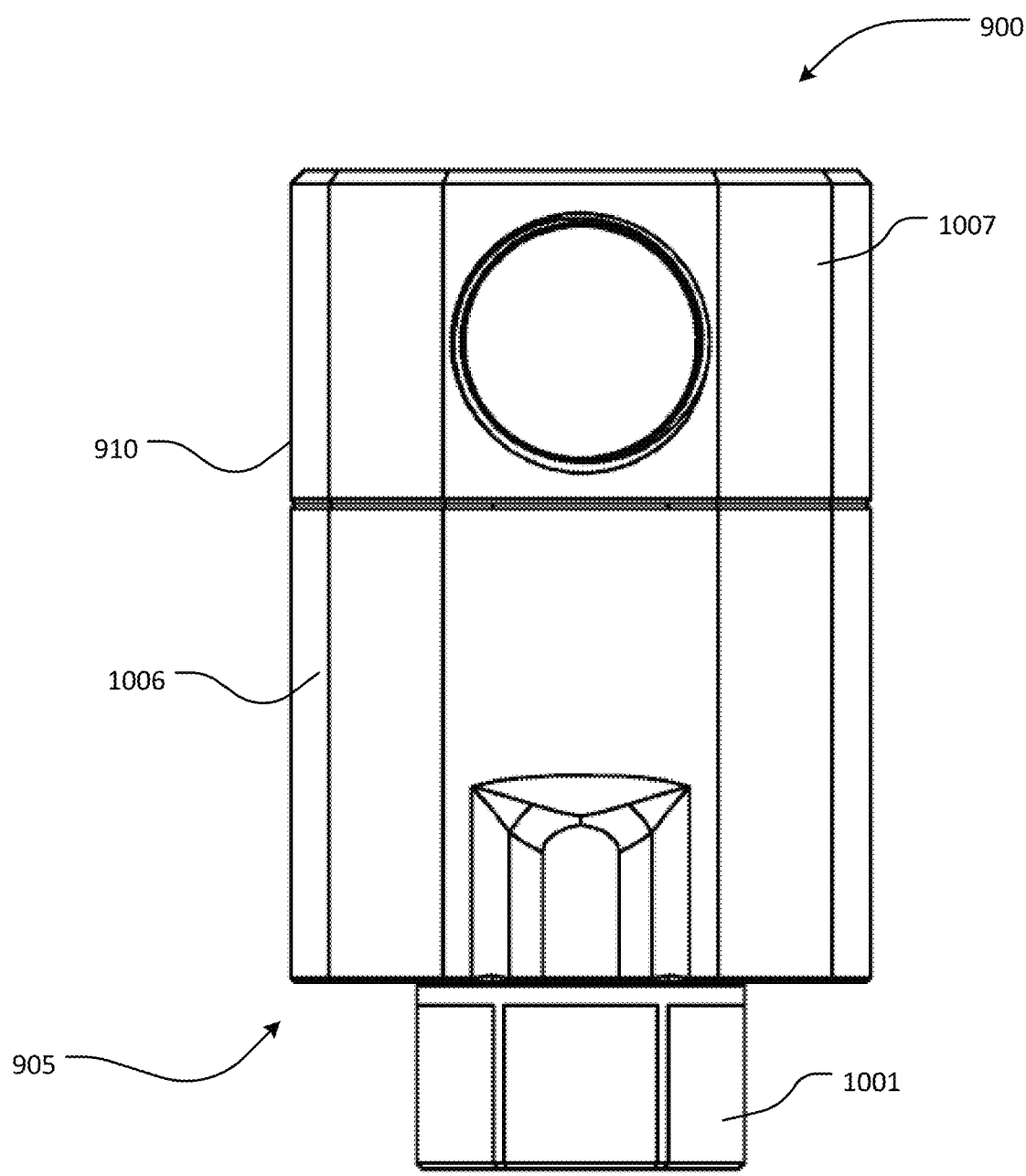
FIG. 9 shows another illustrative rotary union, according to aspects described herein.

FIG. 9 shows another illustrative rotary union such as a single port rotary union 900, according to aspects described herein. The single port rotary union 900 includes an upper housing 1007 physically connected to a lower housing 1006 forming a housing 910. A central shaft 1001 extends outward from the housing 910 through an opening in the bottom surface 905 (e.g., a lower face) of the lower housing 1006.

Figure 10:
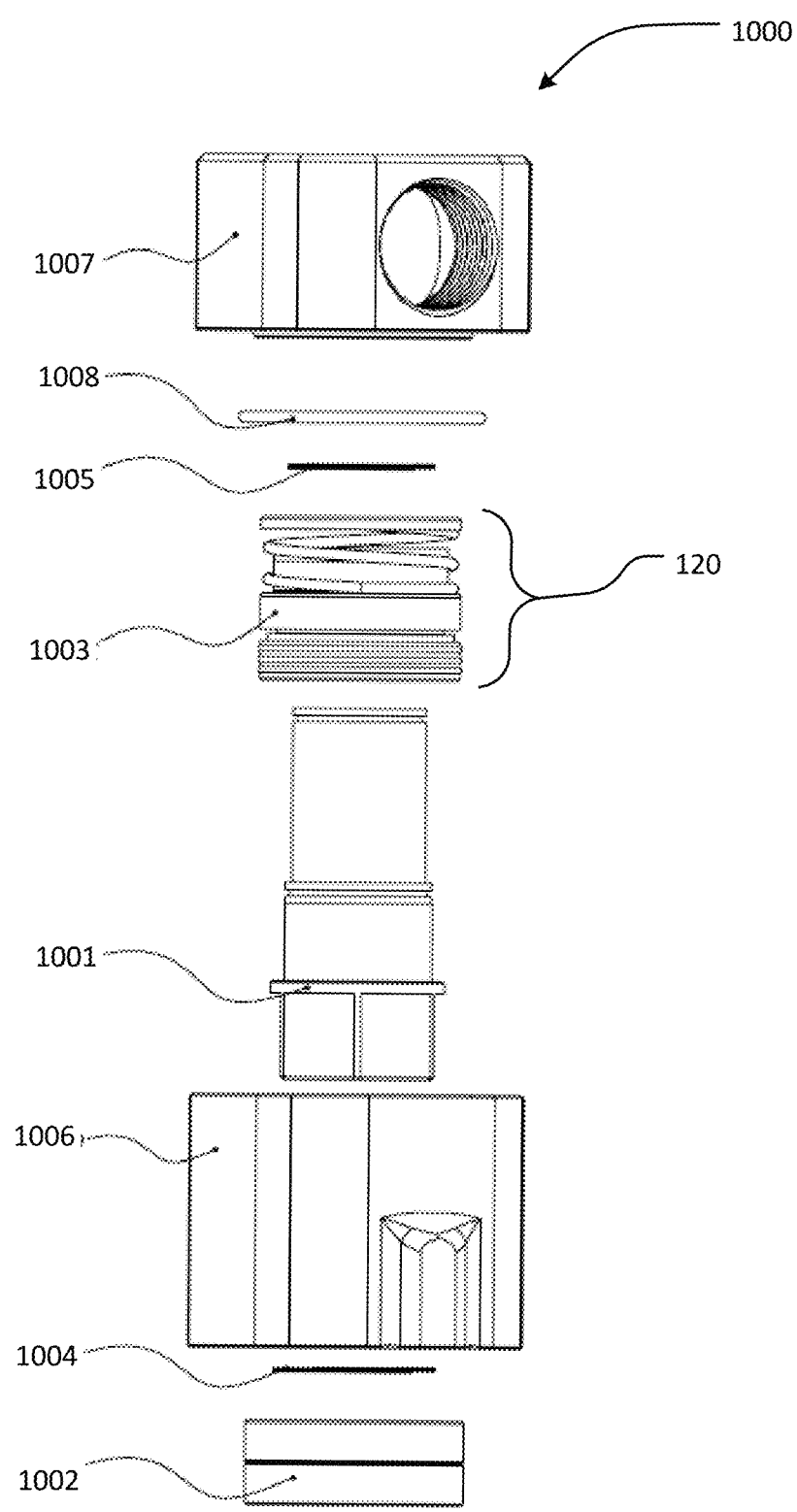
FIG. 10 shows an exploded view of the illustrative rotary union of FIG. 9, according to aspects described herein.

FIG. 10 shows an exploded view of the illustrative rotary union 900 of FIG. 9. The rotary union 900 may include the central shaft 1001, a bearing 1002 (e.g., a sealed double ball bearing), a retaining ring 1004 (e.g., a spiral retaining ring), a retaining ring 1005 (e.g., a spiral retaining ring), the lower housing 1006, the upper housing 1007, and an O-ring 1008 (e.g., a Viton O-Ring). In some cases, the retaining ring 1004 may have a same diameter or a different diameter than the retaining ring 1005.

Figure 11B:
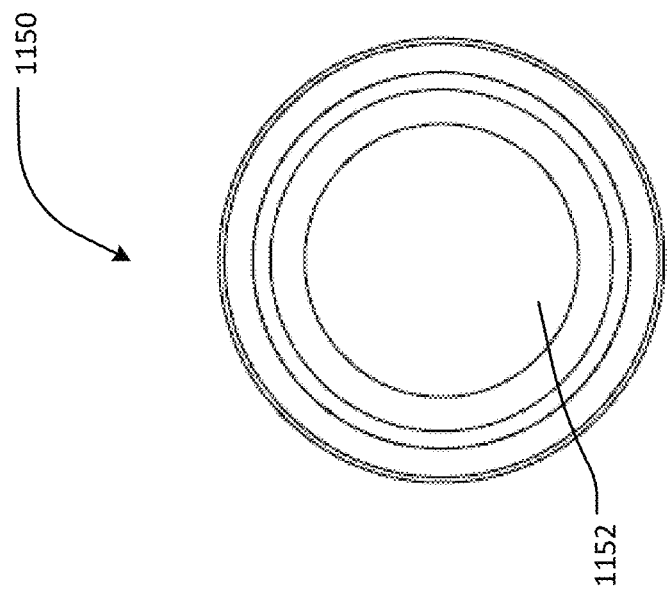
FIGS. 11A and 11B show views of distal ends of a shaft portion of the rotary union of FIG. 9, according to aspects described herein.
Figure 11A:
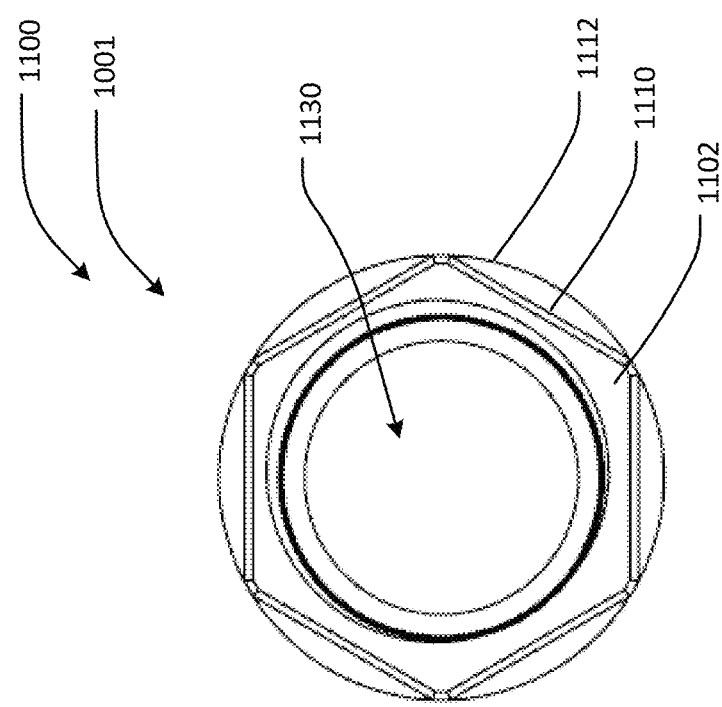

FIGS. 11A and 11B show views of distal ends of the central shaft 1001 of the rotary union 900 of FIG. 9. The lower distal end 1100 includes a central opening 1130 concentric with the central shaft 1001 and centered on a central axis of the rotary union 900. The central opening 1130 may comprise a fluid port configured to couple to a fluid line to, such as via a threaded connection. The bottom surface 1102 may be substantially flat and may have a polygonal shape (e.g., a hexagon, a square, etc.) or may be round. In some cases, the central shaft 1001 may include an annular ring 1112. The upper distal end 1150 may have a flat surface and may be captured within or near a cavity of the upper housing 1007 when assembled within the rotary union 900.

Figure 12A:
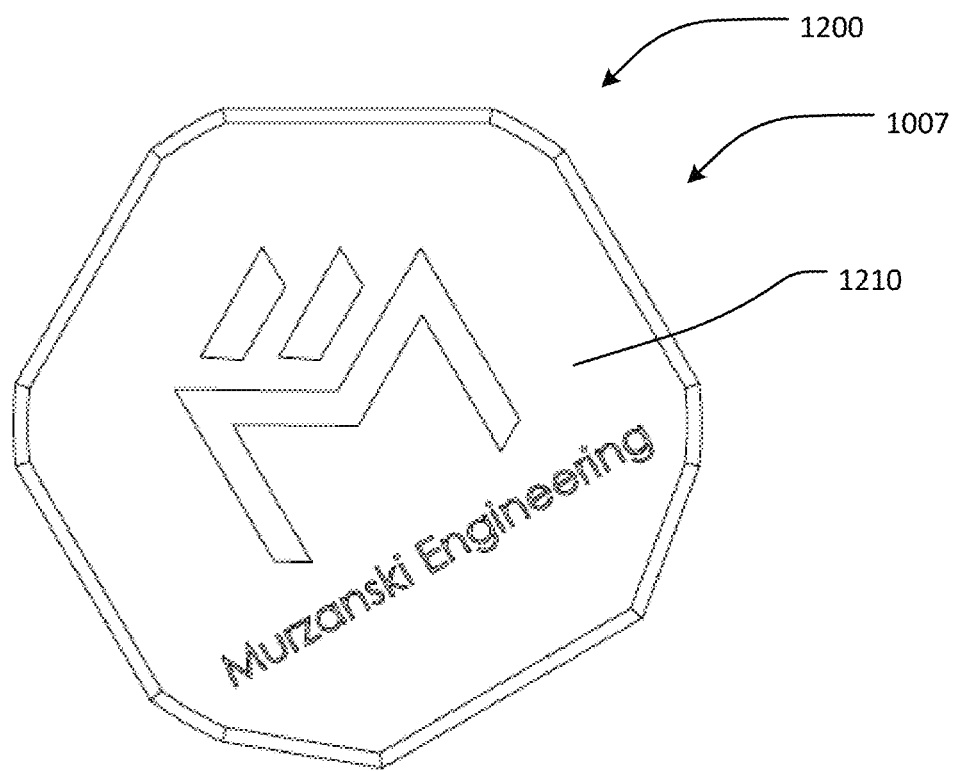
FIGS. 12A and 12B show views of an upper housing portion of the rotary union of FIG. 9, according to aspects described herein.
Figure 12B:
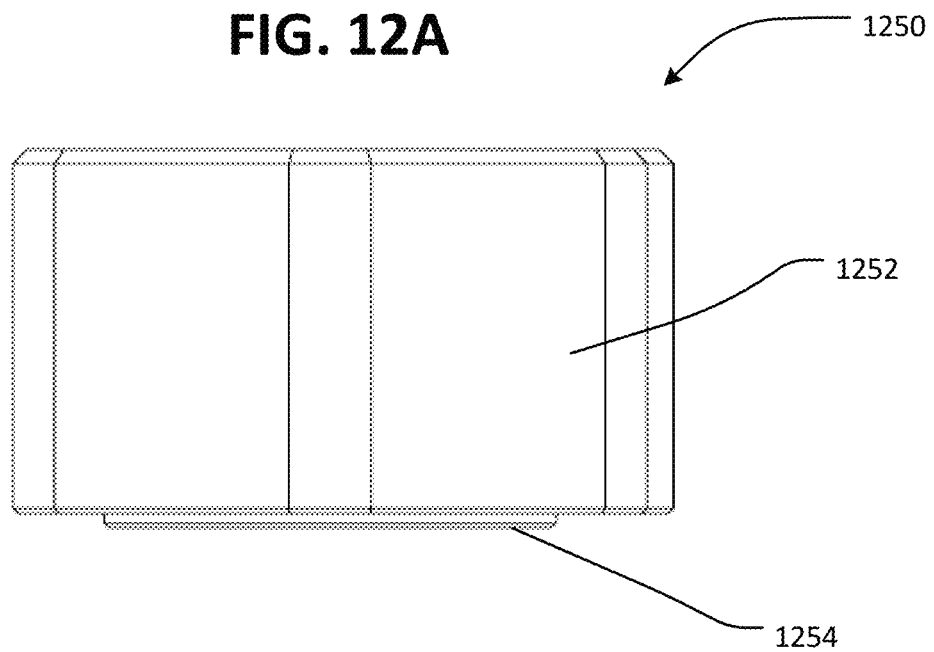

FIG. 12A shows a top view 1200 of an upper surface 1210 of the upper housing 1007. The upper housing 1007 (and the lower housing) may have a polygonal shape (e.g., a square, a rectangle, a hexagon, a decahedron, a dodecahedron, etc.), a cylindrical shape, or the like. FIG. 12B shows a side view 1250 of the upper housing 1007 of the rotary union 900 of FIG. 9, where the sides of a polygonal shaped upper housing may include a plurality of flat sides 1252. In some cases, the side(s) of the upper housing 1007, or a portion of the upper housing may be curved, such as when the upper housing 1007 has a cylindrical shape. The upper housing 1007 may include a lower edge 1254 that extends from the lower face of the upper housing 1007. The lower edge 1254 may facilitate installation and/or capture the O-Ring 1008 upon installation to facilitate a seal between the lower face of the upper housing 1007 and an upper face of the lower housing 1006.

Figures 13A, 13B:
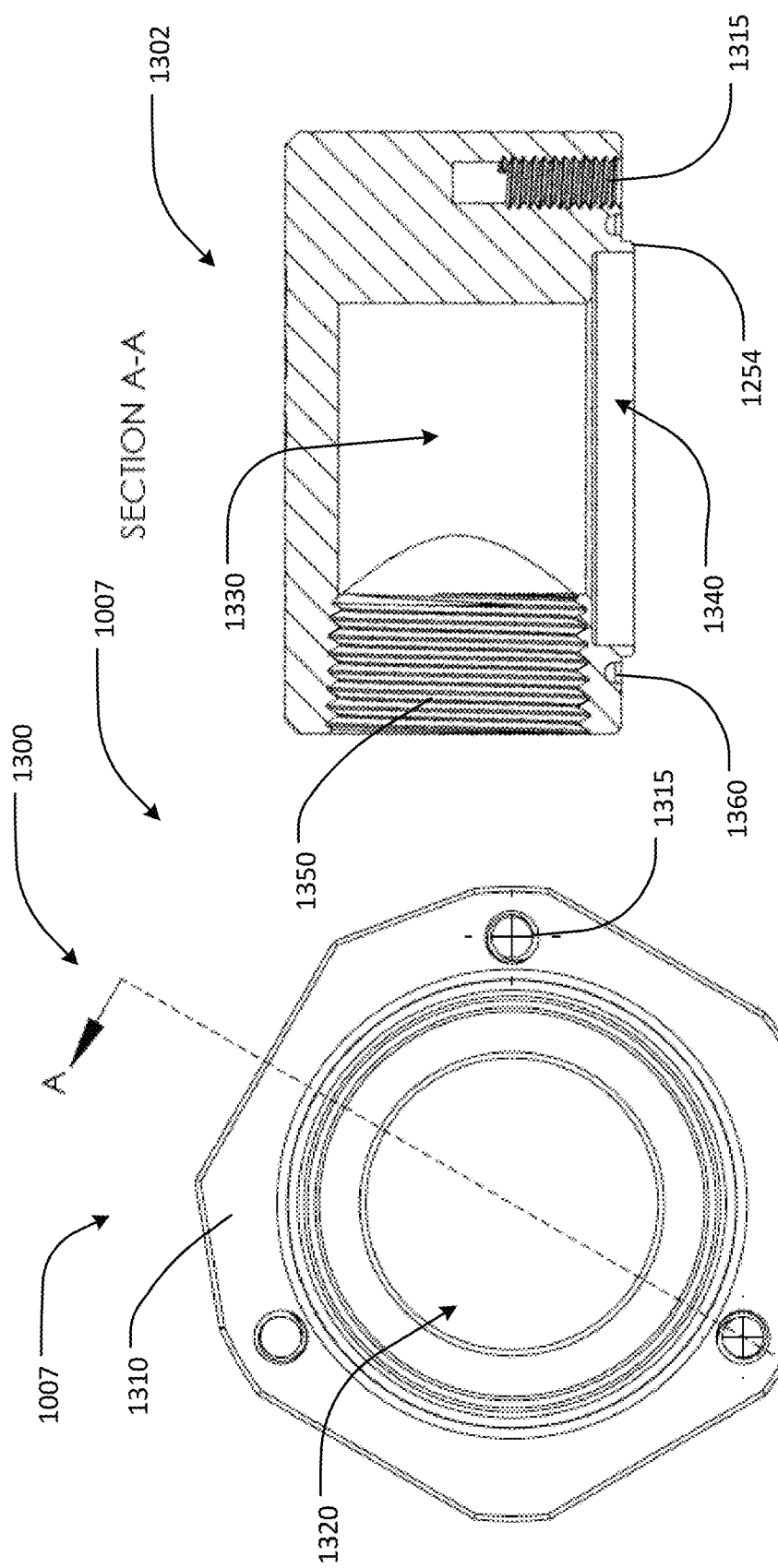
FIG. 13A shows a bottom view of the upper housing portion of the illustrative rotary union of FIG. 9, according to aspects described herein.
FIG. 13B shows a cross-sectional view of the upper housing portion of the illustrative rotary union of FIG. 9, according to aspects described herein.

FIG. 13A shows a bottom view 1300 of the upper housing 1007 and FIG. 13B shows a cross-sectional view 1302 of the upper housing 1007 of the illustrative rotary union 900 of FIG. 9. The lower surface 1310 of the upper housing 1007 may be substantially flat and may include one or more threaded holes perpendicular to the lower surface 1310. The threaded holes may facilitate connection of the lower housing 1006 to the upper housing and/or may be used to facilitate installation of the rotary union 900 upon a rotating surface (e.g., a rotary table). A central opening may be centered on the central axis of the upper housing 1007 and may form a flow cavity for fluids within the rotary union 900. The cross-sectional view 1302 of FIG. 13A shows a groove 1360 surrounding the lower edge 1254, where the lower edge may extend within the lower housing 1006 when assembled. The groove 1360 may receive the O-ring 1008. The fluid port 1350 may provide a rotating fluid port within a rotating frame of reference associated with a surface of a rotary device (e.g., a rotary table). The fluid port 1350 may be in fluid communication with a cavity 1330 with the upper housing.

FIGS. 14A and 14B show side views 1400 and 1410 of the central shaft 1001 of the rotary union 900 of FIG. 9. The central shaft 1001 may include a first polygonal section 1420, a second cylindrical section 1430 and a third cylindrical section 1440, and a distal end 1450. The first polygonal section 1420 may include one or more flat sides 1424 where edges 1422 between adjacent sides (e.g., flat sides 1424) may abut an edge of the annular ring 1112. At least a portion of the flat sections may extend inward from the annular ring 1112.

The central shaft 1001 may have multiple sections defined by different radii, such as the annular ring 1112 of the first section 515 (e.g., a polygonal section), the second cylindrical section 1430, and the third cylindrical section 1440. The annular ring may have a first radius machined to provide an edge near the bottom surface of the lower housing 1006. The second cylindrical section 1430 may have a radius less than the radius of the annular ring and within a defined tolerance with respect to a radius of an inner surface of the bearing 1002 (e.g., a shaft bearing as discussed above). The radius of the annular ring 1112 may be greater than the radius of the second section 1420 such that a bottom surface of the bearing 110 rests upon an upper surface of the annular ring 1112. A groove 1434 may be formed between an edge of the second cylindrical section and a second annular ring 1442, where the second annular ring 1442 may have a radius similar to the radius of the second cylindrical section 1430. The groove 1434 may hold the retaining ring (e.g., a spiral retaining ring) to secure the bearing 1002 to the central shaft 1001. The third cylindrical section 1440 of the central shaft 1001 has a third radius that is less than the radius of the second cylindrical section 1320. The radius of the third cylindrical section 1440 is within a first defined tolerance with respect to a radius of an inner surface of rotating components the seal 1003 (e.g., a shaft seal assembly, a mechanical seal as discussed above, etc.). A groove 1446 may be formed between the third cylindrical section 1440 and an annular ring 1452, where the retaining ring 1005 is positioned to secure the spring of the seal into position on the central shaft.

Figure 15A:
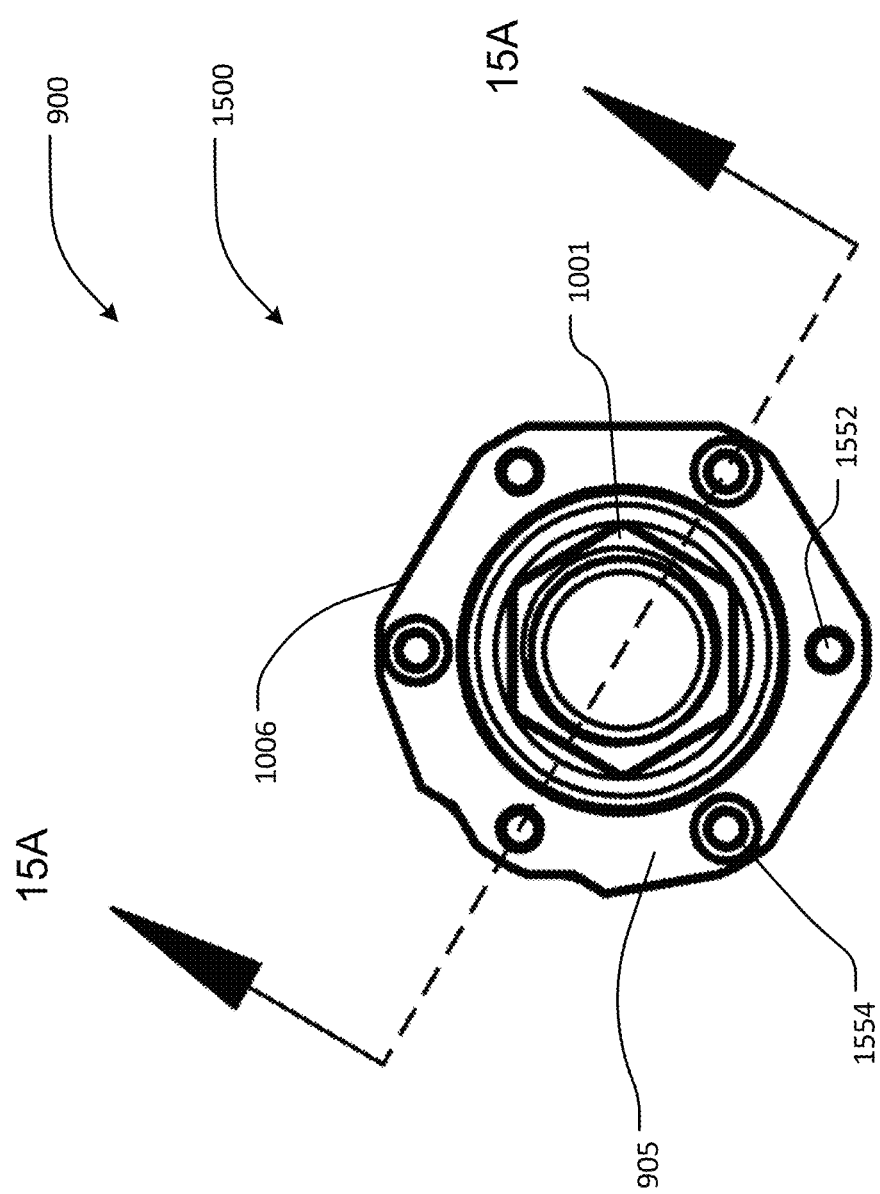
FIG. 15A shows a bottom view of the illustrative rotary union of FIG. 9, according to aspects described herein

FIG. 15A shows a bottom view 1500 of the illustrative rotary union 900 of FIG. 9. The bottom surface 905 may be substantially flat, where the first polygonal section of the central shaft 1001 is axially aligned with a central opening of the housing 1510 along a central axis and extends downward from a central opening of the lower housing 1006. A plurality of threaded holes 1592 may be distributed around the bottom surface 905 of the lower housing 1006 and that may facilitate connection of the rotary union to a flange and/or a rotating surface. Additionally, a plurality of through holes 1594 may be provided through the lower housing to facilitate mechanical connection between the lower housing and a threaded hole in the bottom surface of the upper housing 1007.

Figure 15B:
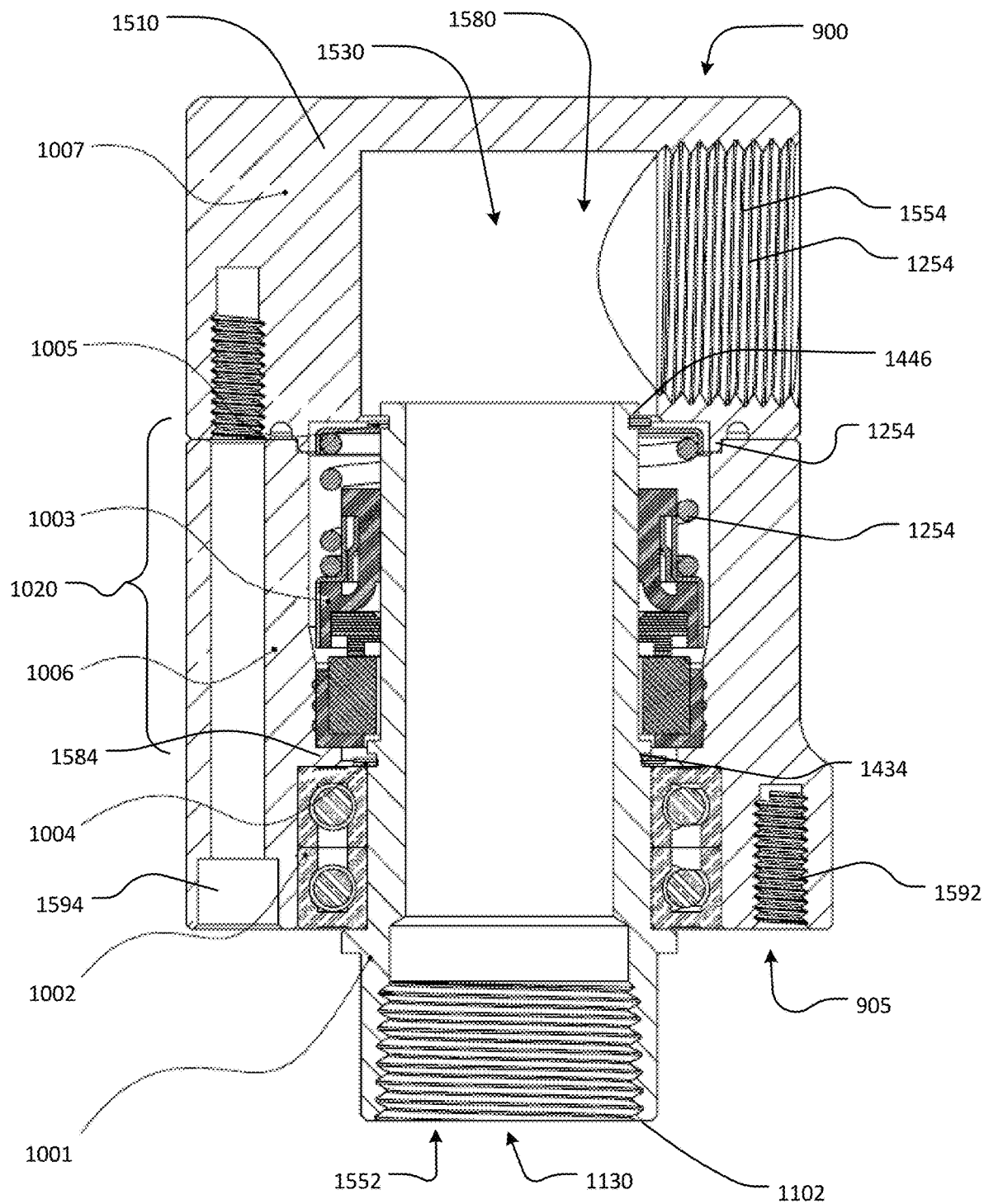
FIG. 15B shows a cross-sectional view of the illustrative rotary union of FIG. 9, according to aspects described herein.

FIG. 15B shows a cross-sectional view of the illustrative rotary union 900 of FIG. 9 along line 15A-15A. A housing 1510 may be formed via connection of the lower housing 1006 with the upper housing 1007, such as use of mechanical fasteners inserted through the through holes 1594 to threadedly connect to threaded holes 1620 in the lower surface 1310 of the upper housing 1007. The O-ring 1008 (or gasket) may be installed within the groove 1360 in the lower surface 1310 of the upper housing 1007 to facilitate a fluid seal. In some cases, the lower housing may be welded to the upper housing 1007 to form a continuous housing 1510. Within a central cavity of the housing 1530, the central shaft may be installed such an upper surface of the annular ring 1112 may be substantially even with the lower surface of the lower housing 1006. Additionally, the bearing 1002 may be installed on the second cylindrical section of the central shaft 1001 and secured between the upper surface of the annular ring 1112 and the retaining ring 1004 and an annular ring 1584 on the interior surface of the lower housing 1006.

A stationary portion of a mechanical seal 1020 (e.g., seal 1003) may rest upon the annular ring 1584 and on the second annular ring 1442 of the central shaft 1001. A face of a rotating portion of the seal 1003 may contact a face of the stationary portion of the seal 1003 within the third cylindrical section 1440, where a surface 1444 of the contacts a central surface of the rotary and stationary components of the seal based on a defined fit. A distal end of the seal assembly holding a spring of the seal may be secured by the retaining ring 1005 and may contact a portion of the upper housing 1007 such that the spring provides a force to engage the surface of the rotating component with a surface of the stationary component. In some cases, the seal 1003 is a single pump seal, or other such seal as discussed above. A fluid channel 1580 is formed within the interior cavity between a stationary port 1552 and a second rotating port 1554.

Figure 16B:
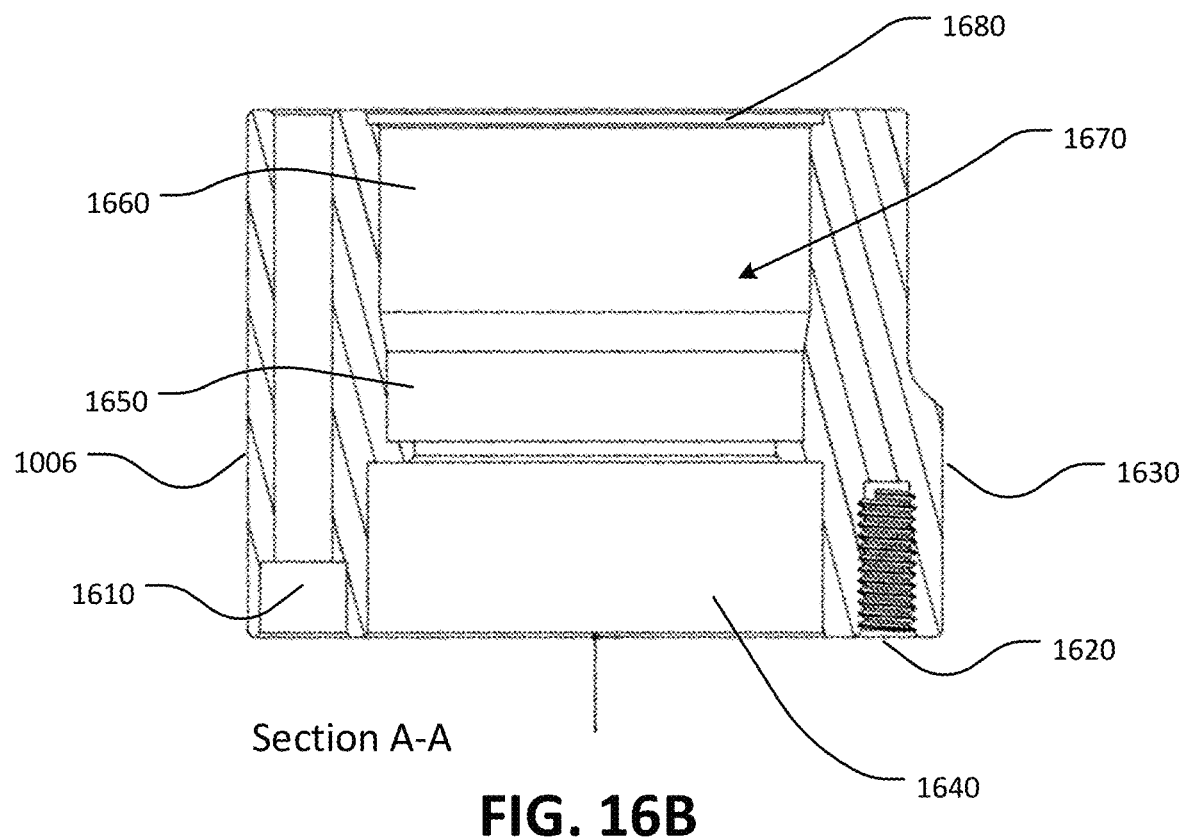
FIG. 16B shows cross-sectional view A-A of FIG. 16A and FIG. 16C show cross-sectional views B-B of FIG. 16A of the lower housing portion of the illustrative rotary union of FIG. 9, according to aspects described herein.
Figure 16A:
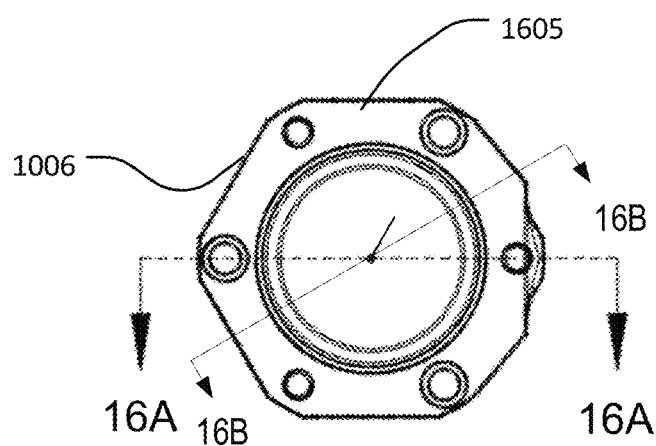
FIG. 16A shows a bottom view of the lower housing portion of the illustrative rotary union of FIG. 9, according to aspects described herein.

FIG. 16A shows a bottom view of the lower housing 1006 of the illustrative rotary union 900 of FIG. 9. The bottom surface 1605 of the lower housing 1006 includes a plurality of through holes 1610 and a plurality of threaded holes 1620 to secure the lower housing 1006 to the upper housing via the through holes and to a flange or rotating surface via the threaded holes 1620, as discussed above.

Figure 16C:
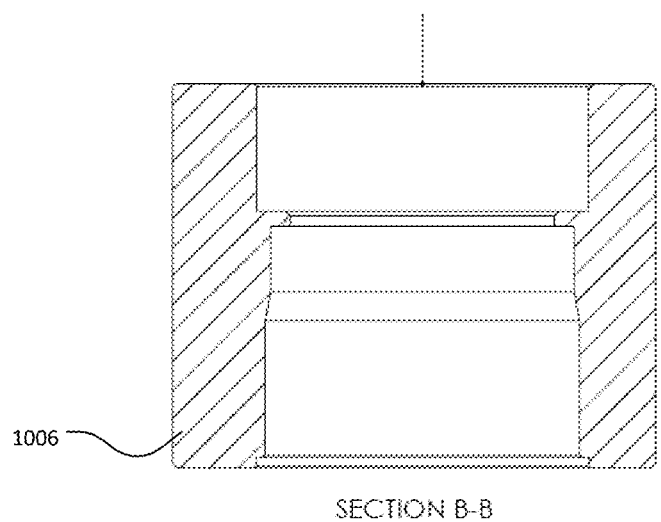

FIG. 16B shows a cross sectional view 16A-16A of FIG. 16A and FIG. 16C shows a cross-sectional view 16B-16B of FIG. 16A of the lower housing portion of the illustrative rotary union of FIG. 9. A central cavity 1670 may be formed from multiple contiguous cavities having different radii. For example, a first cylindrical cavity 1640 may have a first radius corresponding to an outer dimension of the bearing 1002, within a defined tolerance range. A second cylindrical cavity 1650 may have a second radius corresponding to an outer dimension of a component of the seal 1003 (e.g., the stationary component and/or the rotary component). A third cylindrical cavity 1660 may have a third radius greater than an outer diameter of the seal assembly (e.g., greater than an outer dimension of the spring). A cylindrical cutout 1680 into an upper surface of the lower housing 1006 may capture the lower edge 1254 of the upper housing. To provide greater mechanical strength to the connection of the upper housing 1007 to the lower housing 1006. In some cases, an exterior extension 1630 may be used to facilitate location of the threaded hole within a sidewall of the lower housing.

The above-described examples and arrangements are merely some examples of arrangements in which the systems described herein may be used. Various other arrangements employing aspects described herein may be used without departing from the innovative concepts described. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A rotary union comprising:
a housing comprising:
an interior cavity; and
two or more fluid ports through a sidewall of the housing and providing a fluid path between an exterior surface of the housing and the interior cavity;
a central shaft rotatably connected to the housing via a bearing assembly, wherein a first port through the exterior surface of the central shaft is fluidly connected to a first flow channel axial to the central shaft and a second port through the exterior surface of the central shaft is fluidly connected to a second flow channel axial to the central shaft and parallel to the first flow channel; and
a seal assembly comprising:
a spring;
a first fluid seal structure between the exterior surface of the central shaft and an interior surface of the housing and forming a first flow cavity bounded by an exterior surface of the first fluid seal structure and an interior surface of the housing;
a second fluid seal structure between the exterior surface of the central shaft and the interior surface of the housing, wherein the spring separates the first fluid seal structure and the second fluid seal structure, wherein a second flow cavity is bounded by the interior surface of the housing, the exterior surface of the central shaft, an interior surface of the first fluid seal structure, and an interior surface of the second fluid seal structure; and
wherein the spring applies a sealing force to the interior surface of the first fluid seal structure and the interior surface of the second fluid seal structure;
wherein the first fluid seal structure comprises a first stationary seal component physically contacting an interior surface of the housing adjacent to a first side of an annular ring formed on the interior surface of the housing and a first rotating seal component physically contacting the exterior surface of the central shaft and wherein the sealing force seals a first sealing face of the first rotating seal component to a second sealing face of the first stationary seal component; and
wherein the second fluid seal structure comprises a second stationary seal component physically contacting the interior surface of the housing adjacent to a first side of an annular step formed in the interior surface of the housing and a second rotating seal component physically contacting an exterior face of the central shaft, and wherein the sealing force applied to the second stationary sealing structure seals a third sealing face of the second rotating seal component to a fourth sealing face of the second stationary seal component.

2. The rotary union of claim 1, wherein the first port of the two or more fluid ports facilitates fluid flow into the housing.

3. The rotary union of claim 1, wherein the second port of the two or more fluid ports facilitates fluid flow out from the housing.

4. The rotary union of claim 1, wherein the first flow channel of the central shaft comprises an integral one-way valve structure.

5. The rotary union of claim 1, further comprising the bearing assembly set adjacent to a second side of the annular ring formed on the interior surface of the housing.

6. The rotary union of claim 1, wherein a fluid seal is created by a physical connection between the first sealing face and the second sealing face and by a physical connection between the third sealing face and the fourth sealing face.

7. The rotary union of claim 1, wherein the first and third sealing faces comprise one of a ceramic component and a graphite component and the second and fourth sealing faces comprise the remaining one of the ceramic component and the graphite component.

8. The rotary union of claim 1, wherein the seal assembly comprises a pump seal.

9. A multiple channel rotary union comprising:
a central shaft comprising two or more fluid channels;
a housing comprising:
two or more fluid ports;
an opening in a bottom face of the housing;
an interior cavity, wherein the central shaft is partially enclosed within the interior cavity via the opening; and
a first annular ring formed on an interior surface of the housing, the first annular ring having a first side facing the interior cavity of the housing and a second side facing the opening in the bottom face of the housing; and
a bearing rotatably coupling the central shaft to the housing, wherein a first side of the bearing is adjacent to the opening in the bottom face of the housing and a second side of the bearing is adjacent to the second side of the first annular ring; and
a seal assembly forming one or more flow channels between each of the two or more fluid channels of the central shaft to corresponding ports of the two or more fluid ports of the housing, the seal assembly comprising:
a first stationary seal component physically contacting the interior surface of the housing adjacent to the first side of the first annular ring;
a first rotating seal component physically contacting an exterior face of the central shaft;
one or more springs providing a force engaging a first sealing face of the first rotating seal component to a second sealing face of the first stationary seal component;
a second stationary seal component physically contacting the interior surface of the housing adjacent to a first side of an annular ridge formed in the interior surface of the housing; and
a second rotating seal component physically contacting an exterior face of the central shaft, and wherein the one or more springs provide a force to seal a third sealing face of the second rotating seal component to a fourth sealing face of the second stationary seal component.

10. The multiple channel rotary union of claim 9, wherein a first distal end comprises a face comprising at least one input port and at least one output port.

11. The multiple channel rotary union of claim 9, wherein a second distal end is enclosed by the housing, wherein the second distal end defines a portion of a flow channel within the housing.

12. The multiple channel rotary union of claim 9, wherein a first flow channel within the interior cavity of the housing is formed between an exterior surface of the second stationary seal component and an upper face of the interior cavity of the housing, the upper face of the interior cavity of the housing being opposite to and spaced from a face of a distal end of the central shaft.

13. The multiple channel rotary union of claim 9, wherein a second flow channel within the interior cavity of the housing is defined by a first surface of the first rotating seal component and a second surface of the second rotating component, wherein the first surface of the first rotating seal component contacts a first end of the one or more springs and the second surface of the second rotating seal component contacts a second end of the one or more springs.

14. The multiple channel rotary union of claim 9, wherein a first fluid channel of the two or more fluid channels of the central shaft comprises a check valve.

15. The multiple channel rotary union of claim 14, wherein a fluid channel of the check valve comprises:
a first channel having a first radius corresponding to a diameter of a ball component; and
a one or more grooves machined parallel to a central axis of the check valve, the one or more grooves providing an additional flow volume to the check valve when open.

16. The multiple channel rotary union of claim 9, wherein the housing comprises a first housing component and a second housing component, wherein the first housing component comprises a through bore aligned along a central axis of the housing and the second housing component comprises a partial bore aligned along the central axis of the housing, wherein the second housing component comprises a solid top surface.

17. The multiple channel rotary union of claim 16, wherein the first housing component comprises a plurality of output ports and the second housing component comprises a plurality of inlet ports.

18. A dual flow channel rotary union comprising:
a housing comprising:
a first housing section having a through bore aligned to a central axis of the housing; and
a second housing section having a partial bore aligned to the central axis of the housing, wherein the through bore of the first housing section and the partial bore of the second housing section form a central cavity of the housing;
a central shaft at least partially enclosed by the central cavity of the housing, wherein the central shaft comprises a first flow channel and a second flow channel, wherein the first flow channel comprises a check valve;
a bearing physically secured within a first cavity section of the through bore and a central opening of the bearing is physically secured to a first section of the central shaft;
a seal assembly comprising:
a first mechanical seal portion;

a second mechanical seal portion; and a spring physically contacting the first mechanical seal portion and the second mechanical seal portion, wherein the first mechanical seal portion forms a first flow channel within the central cavity of the housing and between an inlet port of the second housing portion and an inlet port of the check valve and wherein the first mechanical seal portion and the second mechanical seal portion forms a second flow channel within the central cavity of the housing and between an outlet port of the central shaft and an outlet port of the second housing section.

19. The dual flow channel rotary union of claim 18, wherein a distal end of the central shaft is enclosed by the housing and wherein the distal end defines a portion of the first flow channel.

* * * * *